US012758036B2

(12) United States Patent
Sepahpour et al.

(10) Patent No.: US 12,758,036 B2
(45) Date of Patent: Oct. 13, 2026

(54) DISPLAY UNIT WITH INTERMITTENTLY ROTATING DRIVE MECHANISM

(71) Applicants: Bijan Sepahpour, Pennington, NJ (US); Tyler Fedorko, Cinnaminson, NJ (US); Reid Carrico, Indianapolis, IN (US); Nicolas Moriello, Old Bridge, NJ (US)

(72) Inventors: Bijan Sepahpour, Pennington, NJ (US); Tyler Fedorko, Cinnaminson, NJ (US); Reid Carrico, Indianapolis, IN (US); Nicolas Moriello, Old Bridge, NJ (US)

( * ) Notice: Subject to any disclaimer, the term of this patent is extended or adjusted under 35 U.S.C. 154(b) by 0 days.

(21) Appl. No.: 18/939,260

(22) Filed: Nov. 6, 2024

(65) Prior Publication Data

US 2026/0123773 A1 May 7, 2026

(51) Int. Cl.

| | |
|---|---|
| ***A47F 3/11*** | (2006.01) |
| ***A47F 5/00*** | (2006.01) |
| ***A47F 5/025*** | (2006.01) |
| ***F16H 29/12*** | (2006.01) |

(52) U.S. Cl.

CPC .............. *A47F 3/11* (2013.01); *A47F 5/0087* (2013.01); *A47F 5/025* (2013.01); *F16H 29/12* (2013.01)

(58) Field of Classification Search

CPC .......... A47F 3/11; A47F 5/0087; A47F 5/025; F16H 29/12; F16H 29/00

See application file for complete search history.

(56) References Cited

U.S. PATENT DOCUMENTS 176,981 A * 5/1876 Morrison ................ A47F 5/025 248/349.1
466,767 A * 1/1892 Brock et al. ........... A47B 49/00 108/103
729,642 A * 6/1903 Nash ...................... A47B 11/00 211/121
732,341 A * 6/1903 Devine ................... A47F 5/025 416/100
871,190 A * 11/1907 Shortill .................. A47F 5/025 211/115

(Continued)

FOREIGN PATENT DOCUMENTS

CH 473441 A * 5/1969
DE 369467 C * 2/1923

(Continued)

*Primary Examiner* — Stanton L Krycinski
(74) *Attorney, Agent, or Firm* — Kattina V. Barsik, Esq.

(57) ABSTRACT

Disclosed is a drive mechanism. The motor unit generates a rotational force to rotate the motor shaft. The primary shaft is adapted to be rotated upon rotation of the motor shaft. The plurality of partially toothed gears are adapted to be rotated upon rotation of the primary shaft. The plurality of fully-toothed gears rotates upon rotation of the plurality of partially toothed gears, and the plurality of secondary shafts rotate upon rotation of the plurality of fully toothed gears. The plurality of plates includes an engaging surface and a plurality of grooves, such that each groove of the plurality of grooves is adapted to engage with a ball portion of each spring loaded ball plunger of the plurality of spring loaded ball plungers during the rotation of the each fully toothed gear of the plurality of fully toothed gears to intermittently rotate each secondary shaft.

20 Claims, 30 Drawing Sheets

(56) References Cited

U.S. PATENT DOCUMENTS

| | | | | | | |
|---|---|---|---|---|---|---|
| 917,260 | A | * | 4/1909 | Cunningham | A47F 5/025 | 108/21 |
| 991,541 | A | * | 5/1911 | Rapoport | A47B 49/004 | 312/305 |
| 1,009,452 | A | * | 11/1911 | Thum et al. | A47F 5/025 | 74/125.5 |
| 1,159,256 | A | * | 11/1915 | Nilson | A47F 5/025 | 108/21 |
| 1,208,457 | A | * | 12/1916 | Bellville | A47B 11/00 | 108/94 |
| 1,254,983 | A | * | 1/1918 | Chadwick | A47F 3/08 | 108/22 |
| 1,343,794 | A | * | 6/1920 | Sevczov | A47F 5/025 | 472/36 |
| 1,435,856 | A | * | 11/1922 | Kelly | A47F 5/025 | 108/20 |
| 1,526,811 | A | * | 2/1925 | Strauss | A47F 5/025 | 108/21 |
| 1,571,597 | A | * | 2/1926 | Nichols | A47F 5/025 | 108/20 |
| 1,655,768 | A | * | 1/1928 | Jones | A47F 5/025 | 108/21 |
| 1,689,865 | A | * | 10/1928 | Davis | A63B 71/0672 | 40/598 |
| 1,699,463 | A | * | 1/1929 | Cresci | A47F 5/025 | 104/44 |
| 1,704,953 | A | * | 3/1929 | Schockett | A47F 5/025 | 211/26 |
| 1,717,943 | A | * | 6/1929 | Smith | A47F 5/025 | D6/677.1 |
| 1,725,225 | A | * | 8/1929 | Swan | A47F 5/025 | 40/505 |
| 1,726,990 | A | * | 9/1929 | Kramer | A47F 5/025 | 108/20 |
| 1,731,011 | A | * | 10/1929 | Krawitz | A47F 5/025 | 40/473 |
| 1,782,257 | A | * | 11/1930 | Dumler | A47F 5/025 | 211/163 |
| 1,826,533 | A | * | 10/1931 | Steele | A47F 5/025 | 211/1.55 |
| 1,875,563 | A | * | 9/1932 | Cooke | A47F 5/025 | 211/163 |
| 1,885,801 | A | * | 11/1932 | Chester | A47F 5/025 | 108/23 |
| 1,915,741 | A | * | 6/1933 | Lomnitz | A47F 5/025 | 108/22 |
| 1,982,776 | A | * | 12/1934 | Woerner | A47F 5/025 | 74/606 R |
| 2,116,127 | A | * | 5/1938 | Steiert | A47F 5/025 | 40/473 |
| 2,209,858 | A | * | 7/1940 | Steiert | A47F 5/025 | 40/473 |
| 2,306,938 | A | * | 12/1942 | Ebbert | A47F 5/025 | 108/30 |
| 2,512,465 | A | * | 6/1950 | Moorhouse | A47F 3/11 | 40/473 |
| 2,549,083 | A | * | 4/1951 | Hamilton | A47F 3/11 | 108/21 |
| 2,555,070 | A | * | 5/1951 | Wood | G09F 11/23 | 40/473 |
| 2,606,664 | A | * | 8/1952 | Messick | A47F 5/025 | 74/436 |
| 2,673,778 | A | * | 3/1954 | Wood | A47F 5/025 | 312/271 |
| 2,762,513 | A | * | 9/1956 | Zaninovich | A47F 5/025 | 211/144 |
| 3,469,708 | A | * | 9/1969 | Pennington | A47F 5/025 | 108/103 |
| 3,506,260 | A | * | 4/1970 | Johnson | A63G 1/26 | 472/29 |
| 3,897,063 | A | * | 7/1975 | Lehwalder | A63F 3/00895 | 273/284 |
| 4,179,168 | A | * | 12/1979 | Isaac | A47F 3/10 | 312/305 |
| 4,236,769 | A | * | 12/1980 | Mueller | A47F 5/025 | 211/144 |
| 5,088,604 | A | * | 2/1992 | Baur | G11B 23/0236 | 211/163 |
| 5,109,989 | A | * | 5/1992 | Kremmin | A47F 5/025 | 211/163 |
| 5,527,228 | A | * | 6/1996 | Genis | F16H 29/12 | 475/164 |
| 5,567,026 | A | * | 10/1996 | Lacewell | A47F 3/10 | 312/401 |
| D392,819 | S | | 3/1998 | Woodward | | |
| 7,665,244 | B2 | * | 2/2010 | Jesness, III | A01G 27/006 | 47/66.6 |
| 8,272,519 | B1 | * | 9/2012 | Rekhels | A47F 5/02 | 211/163 |
| 9,261,176 | B2 | * | 2/2016 | Hoefken | F16H 29/12 | |
| D927,903 | S | | 8/2021 | Park | | |
| 11,980,145 | B2 | * | 5/2024 | Allgeier | A01G 9/00 | |
| 12,207,744 | B2 | * | 1/2025 | Szack | A47G 7/041 | |
| 12,324,527 | B2 | * | 6/2025 | Swears | A47F 7/0071 | |
| 2008/0197087 | A1 | * | 8/2008 | Hunter | A47B 13/088 | 211/1.53 |
| 2009/0151244 | A1 | * | 6/2009 | Jesness, III | A47G 7/041 | 47/79 |
| 2010/0242514 | A1 | * | 9/2010 | Ramos De La Fuente | A47F 5/025 | 62/449 |
| 2013/0334148 | A1 | * | 12/2013 | Eberle | C12M 23/48 | 211/144 |
| 2020/0160463 | A1 | | 5/2020 | He | | |
| 2025/0334172 | A1 | * | 10/2025 | Carrico | A47B 49/008 | |

FOREIGN PATENT DOCUMENTS

| | | | | | |
|---|---|---|---|---|---|
| DE | 456726 | C | * | 3/1928 | |
| DE | 517158 | C | * | 1/1931 | |
| DE | 3725723 | A1 | * | 2/1989 | A47F 5/025 |
| EP | 3162982 | A1 | * | 5/2017 | E04H 6/40 |
| FR | 546159 | A | * | 11/1922 | |
| FR | 578060 | A | * | 9/1924 | |
| FR | 639854 | A | * | 7/1928 | |
| FR | 997456 | A | * | 1/1952 | |
| FR | 1128278 | A | * | 1/1957 | |
| FR | 2624712 | A1 | * | 6/1989 | A47F 11/10 |
| GB | 260739 | A | * | 11/1926 | A47F 5/025 |
| GB | 280793 | A | * | 11/1927 | A47F 5/025 |
| GB | 397183 | A | * | 8/1933 | A47F 5/025 |
| GB | 762204 | A | * | 11/1956 | A47F 5/025 |
| GB | 819888 | A | * | 9/1959 | A47F 5/02 |
| GB | 2589832 | A | * | 6/2021 | A47F 3/001 |
| KR | 200418192 | Y1 | * | 6/2006 | A47F 5/025 |
| KR | 100782525 | B1 | * | 12/2007 | F21V 33/0012 |
| KR | 101114747 | B1 | * | 3/2012 | |
| WO | WO-2013077827 | A2 | * | 5/2013 | A47F 11/00 |
| WO | WO-2018116819 | A1 | * | 6/2018 | F16H 3/48 |
| WO | WO-2020101716 | A1 | * | 5/2020 | F16H 29/12 |
| WO | WO-2021072784 | A1 | * | 4/2021 | A47F 3/11 |

* cited by examiner

DISPLAY UNIT WITH INTERMITTENTLY ROTATING DRIVE MECHANISM

TECHNICAL FIELD

The present disclosure relates generally to the field of showcases and display devices to showcase or display various articles. More particularly, the present disclosure relates to a display unit with an intermittently rotating drive mechanism.

BACKGROUND

In the realm of displaying valuable items through display cases, traditional methods of displaying the valuable items such as merchandise, trophies, awards, memorabilia, or artwork etc. faced notable challenges. Display cases have traditionally been used to showcase valuables, but they have limitations. They're often static and inflexible, making it difficult to change or rotate items. The static nature of conventional display cases, which limited the ability to rotate or reposition items dynamically. This static presentation inhibited the comprehensive exhibition of three-dimensional objects, intricate artworks, and diverse collections. The viewers are confined to a single perspective, impeding their ability to engage fully with the showcased items and appreciate their intricate details from different angles. This is a problem for 3D objects, artwork, and collections that need to be displayed dynamically. Visitors can only see these items from one angle, which limits their understanding and enjoyment of the details and depth.

Moreover, the traditional display cases displayed less than ideal spatial efficiency due to their fixed-shelf structure. The incapacity to rearrange items led to inefficiencies, resulting in unutilized space and a decrease in the overall aesthetic appeal of the exhibit. The inflexibility in shelf arrangements posed challenges for curators, limiting their ability to fully utilize the display area and exhibit a greater number of items within the same space. The fixed shelf structure also causes inability to rearrange items within these cases that results in operational inefficiencies, manifesting as notable underutilized space and a palpable decline in the overall aesthetic allure of the exhibit. As a consequence, the potential to showcase a more extensive array of items within the same space was curtailed, impacting the overall richness and diversity of the exhibited collection.

Hence, there may be a need to develop an efficient display device that is capable of solving aforementioned problems.

SUMMARY

In view of the foregoing, a drive mechanism is disclosed. The drive mechanism includes a motor unit having a motor shaft such that the motor unit generates a rotational force to rotate the motor shaft. The drive mechanism further includes a primary shaft that is adapted to be coupled to the motor unit such that the primary shaft is adapted to be rotated upon rotation of the motor shaft. The drive mechanism further includes a plurality of partially toothed gears that are adapted to be coupled to the primary shaft such that the plurality of partially toothed gears is adapted to be rotated upon rotation of the primary shaft. The drive mechanism further includes a plurality of secondary shafts that are disposed around the primary shaft. The drive mechanism further includes a plurality of fully toothed gears that are coupled to the plurality of secondary shafts wherein each fully toothed gear of the plurality of fully toothed gears is in mesh engagement with each partially toothed gear of the plurality of partially toothed gears such that the plurality of fully toothed gears rotate upon rotation of the plurality of partially toothed gears, and the plurality of secondary shafts rotate upon rotation of the plurality of fully toothed gears. The drive mechanism further includes a plurality of spring-loaded ball plungers that are adapted to be disposed around the plurality of fully toothed gears. The drive mechanism further includes a plurality of plates coupled to the plurality of secondary shafts wherein each plate of the plurality of plates comprising an engaging surface and a plurality of grooves that are disposed on the engaging surface, wherein the engaging surface is adapted to be in constant contact with each spring loaded ball plunger of the plurality of spring loaded ball plungers during rotation of each fully toothed gear of the plurality of fully toothed gears, and each groove of the plurality of grooves is adapted to engage with a ball portion of each spring loaded ball plunger of the plurality of spring loaded ball plungers during the rotation of the each fully toothed gear of the plurality of fully toothed gears to intermittently rotate each secondary shaft of the plurality of secondary shafts.

In some embodiments of the present disclosure, the drive mechanism further includes a holding plate that is coupled to the primary shaft and adapted to be coupled to the plurality of partially toothed gears.

In some embodiments of the present disclosure, the holding plate further includes an upper surface and a lower surface such that the upper surface and the lower surface are adapted to couple to the plurality of partially toothed gears.

In some embodiments of the present disclosure, the drive mechanism further includes a plurality of plunger holding plates that are coupled to the plurality of secondary shafts and adapted to be coupled to the plurality of fully teethed gears.

In some embodiments of the present disclosure, the plurality of plunger holding plates includes a plurality of holes that are adapted to hold the plurality of spring-loaded ball plungers.

In some embodiments of the present disclosure, the motor unit further includes at least one input drive gear coupled to the motor shaft such that the at least one input drive gear rotates upon rotation of the motor shaft.

In some embodiments of the present disclosure, the drive mechanism further includes at least one driven output gear that is in mesh engagement with the least one input drive gear and adapted to be rotated upon rotation of the at least one input drive gear.

In some embodiments of the present disclosure, the primary shaft is coupled to the at least one driven output gear and adapted to be rotated upon rotation of the at least one driven output gear.

In some embodiments of the present disclosure, the at least one input drive gear includes one of a worm gear or a pinion bevel gear.

In some embodiments of the present disclosure, the at least one driven output gear includes one of a worm wheel gear or a driven bevel gear.

In view of the foregoing, a display unit is disclosed. The display unit includes a drive mechanism. The drive mechanism of a display unit includes a motor unit comprising a motor shaft such that the motor unit generates a rotational force to rotate the motor shaft. The driving mechanism of the display unit further includes a primary shaft that is adapted to be coupled to the motor unit such that the primary shaft is adapted to be rotated upon rotation of the motor shaft. The driving mechanism of the display unit further includes a plurality of partially toothed gears that are adapted to be coupled to the primary shaft such that the plurality of partially toothed gears is adapted to be rotated upon rotation of the primary shaft. The driving mechanism of the display unit further includes a plurality of secondary shafts that are disposed around the primary shaft. The driving mechanism of the display unit further includes a plurality of fully toothed gears that are coupled to the plurality of secondary shafts wherein each fully toothed gear of the plurality of fully toothed gears is in mesh engagement with each partially toothed gear of the plurality of partially toothed gears such that the plurality of fully toothed gears rotate upon rotation of the plurality of partially toothed gears, and the plurality of secondary shafts rotate upon rotation of the plurality of fully toothed gears. The driving mechanism of the display unit further includes a plurality of spring-loaded ball plungers that are adapted to be disposed around the plurality of fully toothed gears. The driving mechanism of the display unit further includes a plurality of plates coupled to the plurality of secondary shafts wherein each plate of the plurality of plates comprising an engaging surface and a plurality of grooves that are disposed on the engaging surface, wherein the engaging surface is adapted to be in constant contact with each spring loaded ball plunger of the plurality of spring loaded ball plungers during rotation of each fully toothed gear of the plurality of fully toothed gears, and each groove of the plurality of grooves is adapted to engage with a ball portion of each spring loaded ball plunger of the plurality of spring loaded ball plungers during the rotation of the each fully toothed gear of the plurality of fully toothed gears to intermittently rotate each secondary shaft of the plurality of secondary shafts.

In some embodiments of the present disclosure, the drive mechanism of the display unit further includes a holding plate that is coupled to the primary shaft and adapted to be coupled to the plurality of partially toothed gears.

In some embodiments of the present disclosure, the holding plate further includes an upper surface and a lower surface such that the upper surface and the lower surface are adapted to couple to the plurality of partially toothed gears.

In some embodiments of the present disclosure, the drive mechanism of the display unit further includes a plurality of plunger holding plates that are coupled to the plurality of secondary shafts and adapted to be coupled to the plurality of fully teethed gears.

In some embodiments of the present disclosure, the plurality of plunger holding plates includes a plurality of holes that are adapted to hold the plurality of spring-loaded ball plungers.

In some embodiments of the present disclosure, the motor unit further includes at least one input drive gear coupled to the motor shaft such that the at least one input drive gear rotates upon rotation of the motor shaft.

In some embodiments of the present disclosure, the drive mechanism of the display unit further includes at least one driven output gear that is in mesh engagement with the least one input drive gear and adapted to be rotated upon rotation of the at least one input drive gear.

In some embodiments of the present disclosure, the primary shaft is coupled to the at least one driven output gear and adapted to be rotated upon rotation of the at least one driven output gear.

In some embodiments of the present disclosure, the at least one input drive gear includes one of a worm gear or a pinion bevel gear.

In some embodiments of the present disclosure, the at least one driven output gear includes one of a worm wheel gear or a driven bevel gear.

BRIEF DESCRIPTION OF DRAWINGS

The above and still further features and advantages of aspects of the present disclosure becomes apparent upon consideration of the following detailed description of aspects thereof, especially when taken in conjunction with the accompanying drawings, and wherein.

To facilitate understanding, like reference numerals have been used, where possible, to designate like elements common to the figures.

DETAILED DESCRIPTION

Figure 1A:
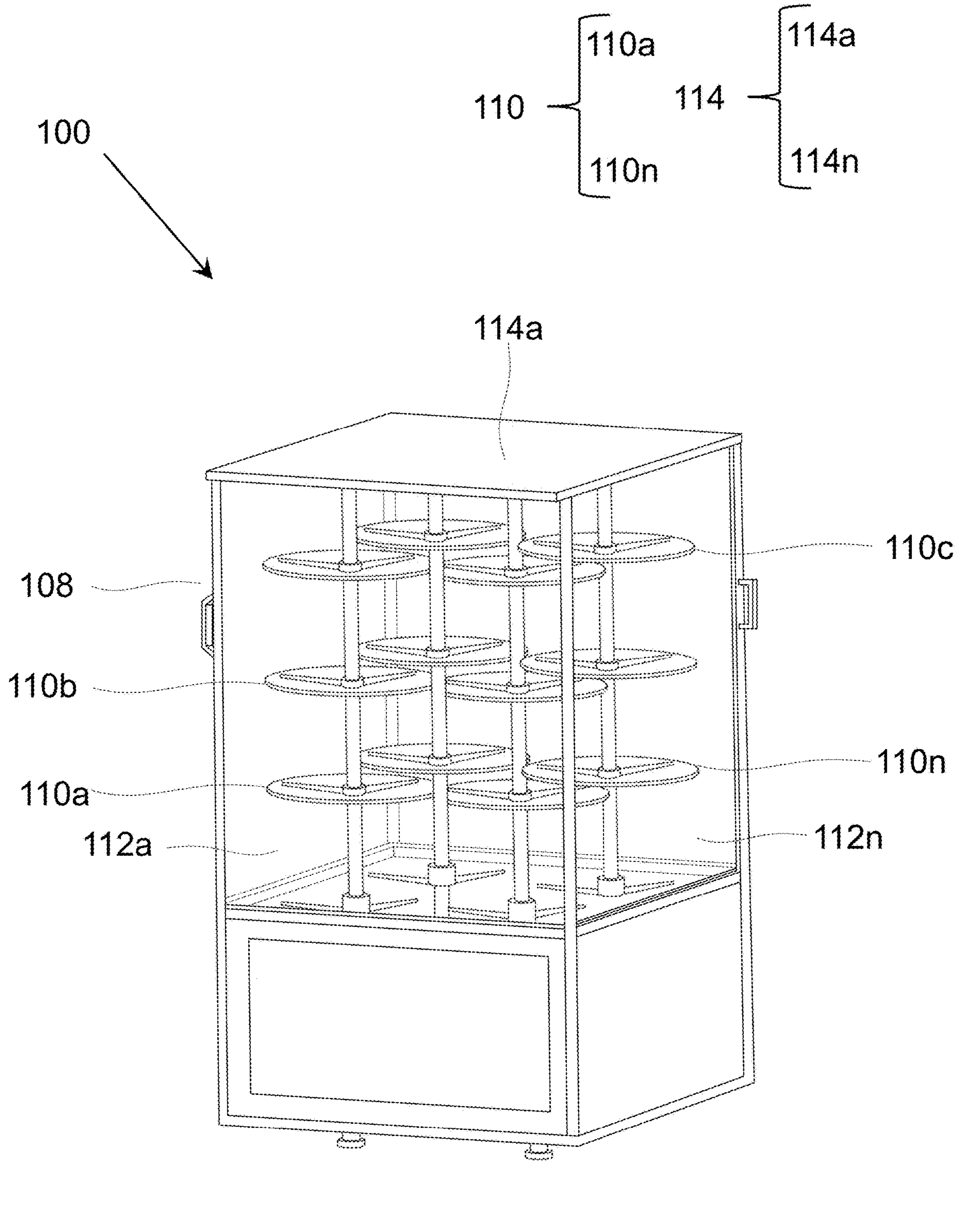
FIG. 1A illustrates a perspective view of a display unit having a square shape, in accordance with an embodiment of the present disclosure.

Various aspects of the present disclosure provide a display unit with an intermittently rotating drive mechanism. The following description provides specific details of certain aspects of the disclosure illustrated in the drawings to provide a thorough understanding of those aspects. It should be recognized, however, that the present disclosure can be reflected in additional aspects and the disclosure may be practiced without some of the details in the following description.

The various aspects including the example aspects are now described more fully with reference to the accompanying drawings, in which the various aspects of the disclosure are shown. The disclosure may, however, be embodied in different forms and should not be construed as limited to the aspects set forth herein. Rather, these aspects are provided so that this disclosure is thorough and complete, and fully conveys the scope of the disclosure to those skilled in the art. In the drawings, the sizes of components may be exaggerated for clarity.

It is understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

The subject matter of example aspects, as disclosed herein, is described specifically to meet statutory requirements. However, the description itself is not intended to limit the scope of this disclosure. Rather, the inventor/inventors have contemplated that the claimed subject matter might also be embodied in other ways, to include different features or combinations of features similar to the ones described in this document, in conjunction with other technologies. Generally, the various aspects including the example aspects relate to a display unit with drive mechanism.

As mentioned, there remains a need for an efficient display unit to maximize viewing of articles. Accordingly, the present disclosure provides the display unit that causes intermittent rotation of the articles for maximizing viewing of the articles. Specifically, the display unit of the present disclosure employs a driving mechanism that facilitates intermittent rotation of the articles which results in better viewing experience of the articles. Eventually, the driving mechanism, by causing intermittent rotation of the articles, facilitates viewers to capture intricate details (three dimensionally) of the articles.

FIG. 1A illustrates a perspective view of a display unit 100 having a square shape, in accordance with an embodiment of the present disclosure. The display unit 100 may be adapted to show or display a plurality of articles (hereinafter referred to as "the articles) to a viewer. The display unit 100 may advantageously facilitate maximum view for the plurality of articles without hiding any of the article of the articles. In some embodiments of the present disclosure, the display unit 100 may be provided with a plurality of castor wheels that may facilitate easy maneuvering of the display unit 100 from one place to another.

In some embodiments of the present disclosure, the display unit 100 may be made up of a material that may have a high strength to weight ratio (S/W) that may advantageously prevent buckling and excessive deflection/deformations in the display unit 100.

In some embodiments of the present disclosure, the display unit 100 may be made up of a material including, but not limited to, plastic, aluminium, steel, stainless steel, high strength polypropylene, and the like. Embodiments of the present disclosure are intended to include and/or otherwise cover any type of known and later developed materials for the display unit 100, without deviating from the scope of the present disclosure.

In some embodiments of the present disclosure, the display unit 100 may have a footprint dimension that may be in a range of 1 square foot to 100 square feet. Embodiments of the present disclosure are intended to include and/or otherwise cover any value/range of the footprint dimension of the display unit 100, without deviating from the scope of the present disclosure.

The display unit 100 may include a cabinet 108, and a plurality of bases 110*a*-110*n* (hereinafter collectively referred to and designated as "the bases 110") disposed inside the cabinet 108.

In some embodiments of the present disclosure, each base of the bases 110 may have cross sectional shape that may be one of, a circular shape, a square shape, a triangular shape, a rectangular shape, and the like. Embodiments of the present disclosure are intended to include and/or otherwise cover any type of shape for each base of the bases 110, without deviating from the scope of the present disclosure.

In some embodiments of the present disclosure, each base of the bases 110 may have a dimension that may be in a range of 0.25 foot to 5 feet. Embodiments of the present disclosure are intended to include and/or otherwise cover any dimension value/range for the bases 104 depending on dimension of the display unit 100, without deviating from the scope of the present disclosure.

The cabinet 108 may include a plurality of walls 112*a*-112*n* (hereinafter collectively referred to and designated as "the walls 112"). The walls 112 may extend along an upper portion of the cabinet 108. Specifically, the first wall 112*a* may extend along the upper portion of the cabinet 108 at a first side of the cabinet 108. The second wall 112*b* may extend along the upper portion of the cabinet 108 at a second side of the cabinet 108. The third wall 112*c* may extend along the upper portion of the cabinet 108 at a third side of the cabinet 108. The fourth wall 112*d* may extend along the upper portion of the cabinet 108 at a fourth side of the cabinet 108. Embodiments of the present disclosure are intended to include and/or otherwise cover any number of walls that may extend along the upper portion of the cabinet 108 at any number of sides of the cabinet 108, without deviating from the scope of the present disclosure.

In some embodiments of the present disclosure, each wall of the walls 112 may be made up of a material including, but not limited to, a glass, a plexiglass, a polymethyl methacrylate (PMMA), and the like. Embodiments of the present disclosure are intended to include and/or otherwise cover any type of known and later developed materials, without deviating from the scope of the present disclosure.

The bases 110 may be disposed at the upper portion of the cabinet 108. The bases 110 may be adapted to hold the articles such that the articles are displayed or showed to the viewer. Each base of the bases 110 may be disposed or arranged at different vertical heights in the upper portion of the cabinet 108. Specifically, each base of the bases 110 may be carried by the plurality of rods (as shown in FIG. 2) at different vertical heights in the upper portion of the cabinet 108. This facilitates a better view for the articles. The bases 110 may be adapted to rotate. Specifically, each base of the bases 110 may be adapted to intermittently rotate such that the articles are clearly visible to the viewer. In other words, the intermittent rotation of each base of the bases 110 may advantageously facilitate the viewer to view the articles without hiding any article of the articles. The viewer may therefore have a sufficient time to view the articles.

In some embodiments of the present disclosure, the upper portion of the cabinet 108 may have a length that may be in a range of 0.5 foot to 12 feet. Embodiments of the present disclosure are intended to include and/or otherwise cover any dimension value/range for the upper portion of the cabinet 108 depending on dimension of the display unit 100, without deviating from the scope of the present disclosure.

The lower portion of the cabinet 108 may be disposed at a lower side of the cabinet 108. The lower portion of the cabinet 108 may be adapted to accommodate an intermittently rotatable drive mechanism (later explained in FIG. 4A). In other words, the drive mechanism may be held inside the lower portion of the cabinet 108. The drive mechanism may be adapted to rotate the bases 110. Specifically, the drive mechanism may be adapted to intermittently rotate the bases 110.

In some embodiments of the present disclosure, the lower portion of the cabinet 108 may have a length that may be in a range of 0.25 foot to 4 feet. Embodiments of the present disclosure are intended to include and/or otherwise cover any dimension value/range for the lower portion of the cabinet 108 depending on dimension of the display unit 100, without deviating from the scope of the present disclosure.

Figure 1B:
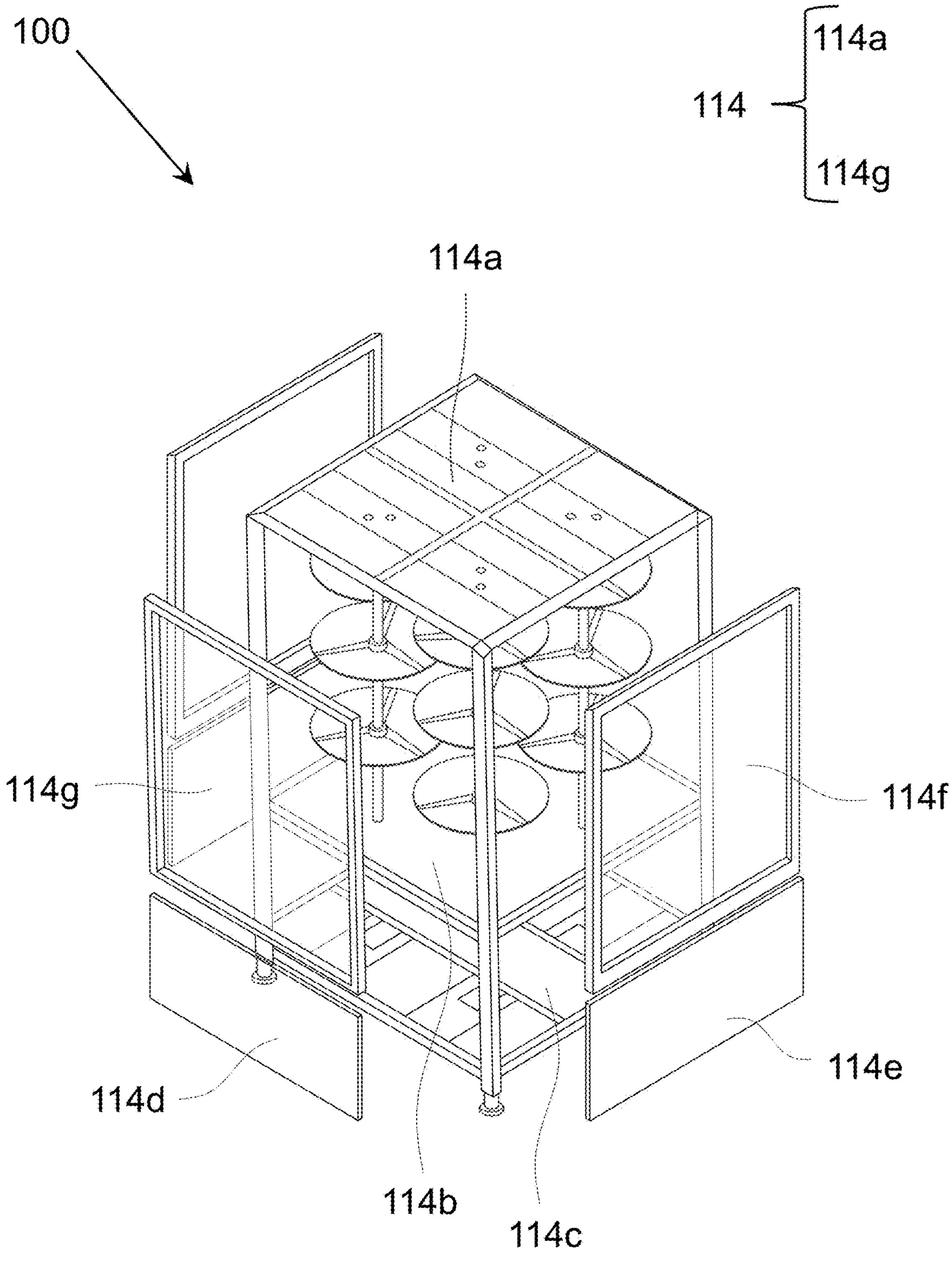
FIG. 1B illustrates a perspective exploded view of the display unit of FIG. 1A, in accordance with an embodiment of the present disclosure.

FIG. 1B illustrates a perspective exploded view of the display unit 100 of FIG. 1A, in accordance with an embodiment of the present disclosure. The cabinet 108 may further include a plurality of panels 114*a*-114*n* (hereinafter collectively referred to and designated as "the panels 114"). The first panel 114*a* may be disposed at a top surface of the cabinet 108. Specifically, the first panel 114*a* may be disposed at the top surface of the upper portion of the cabinet 108. The second panel 114*b* may be disposed beneath the first panel 114*a* and in a parallel configuration to the first panel 114*a*. The second panel 114*b* may be disposed at a bottom surface of the cabinet 102. Specifically, the second panel 114*b* may be disposed at the bottom surface of the upper portion of the cabinet 102. The third panel 114*c* may be disposed beneath the first and second panels 114*a*, 114*b* and in a parallel configuration to the first and second panels 114*a*, 114*b*. Specifically, the third panel 114*b* may be disposed at a bottom surface of the lower portion of the cabinet 102.

The fourth through seventh panels 114*d*-114*g* may be disposed at sides of the lower portion 112. Specifically, the fourth panel 114*d* may be disposed at a first side of the lower portion of the cabinet 102 such that the fourth panel 114*d* covers the first side of the lower portion of the cabinet 102. The fifth panel 114*d* may be disposed at a second side of the lower portion of the cabinet 102 such that the fifth panel 114*d* covers the second side of the lower portion of the cabinet 102. The sixth panel 114*e* may be disposed at a third side of the lower portion of the cabinet 102 such that the sixth panel 114*e* covers the third side of the lower portion of the cabinet 102. The seventh panel 114*f* may be disposed at a fourth side of the lower portion of the cabinet 102 such that the seventh panel 114*f* covers the fourth side of the lower portion of the cabinet 102. Embodiments of the present disclosure are intended to include and/or otherwise cover any number of panels that may be disposed at any number of sides of the lower portion of the cabinet 102 to cover various sides of the lower portion of the cabinet 102, without deviating from the scope of the present disclosure.

Figure 1C:
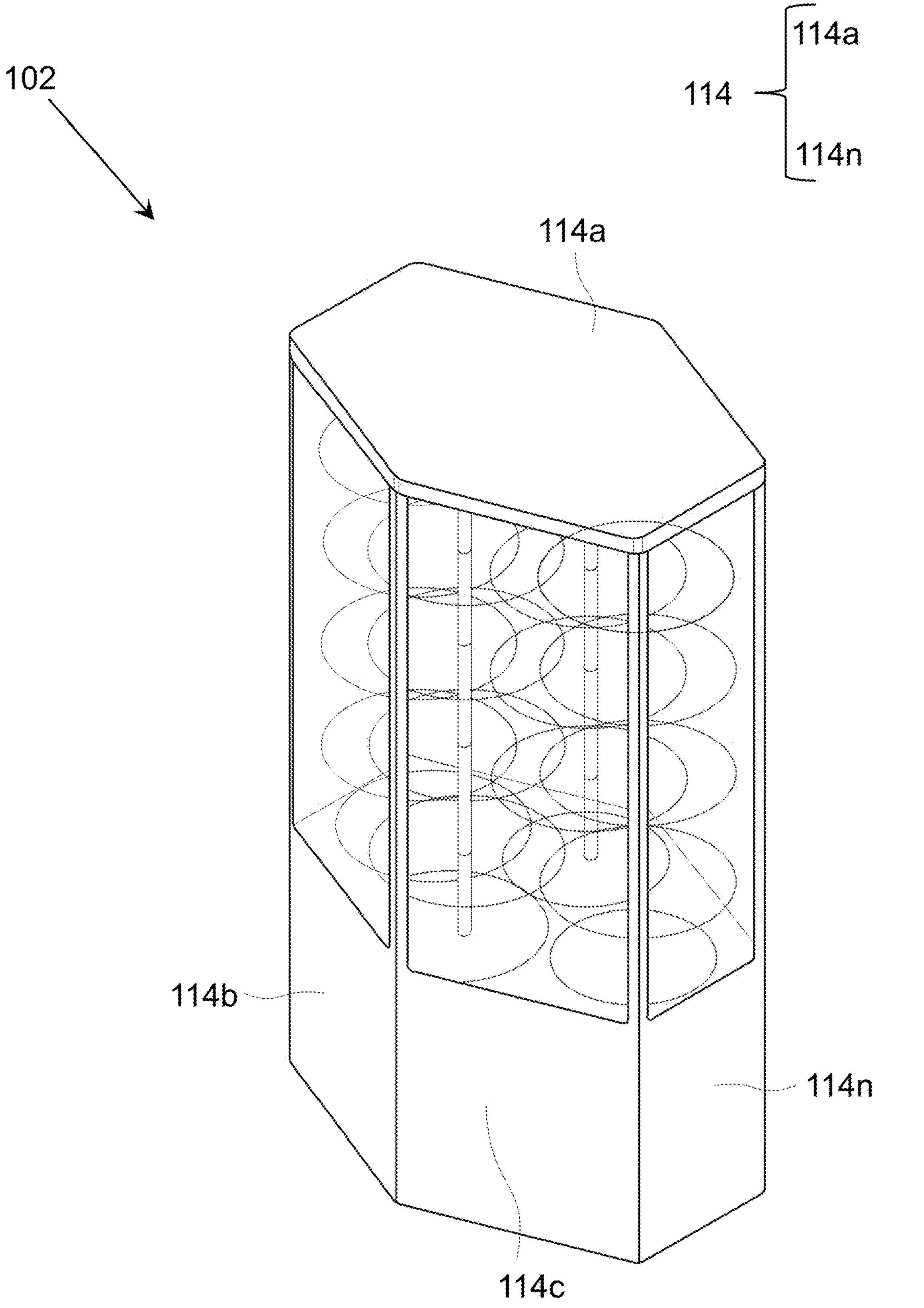
FIG. 1C illustrates a perspective view of another display unit having an irregular hexagonal shape, in accordance with an embodiment of the present disclosure.

FIG. 1C illustrates a perspective view of another display unit 102 having an irregular hexagonal shape, in accordance with an embodiment of the present disclosure. Specifically, cross-sectional shape of the panels 114 of the display unit 101 may have the irregular hexagonal shape.

In some embodiments of the display unit 102 may have a length that may be in a range of 0.5 foot to 15 feet. Embodiments of the present disclosure are intended to include and/or otherwise cover any dimension value/range for the display unit 102, without deviating from the scope of the present disclosure.

Figure 1D:
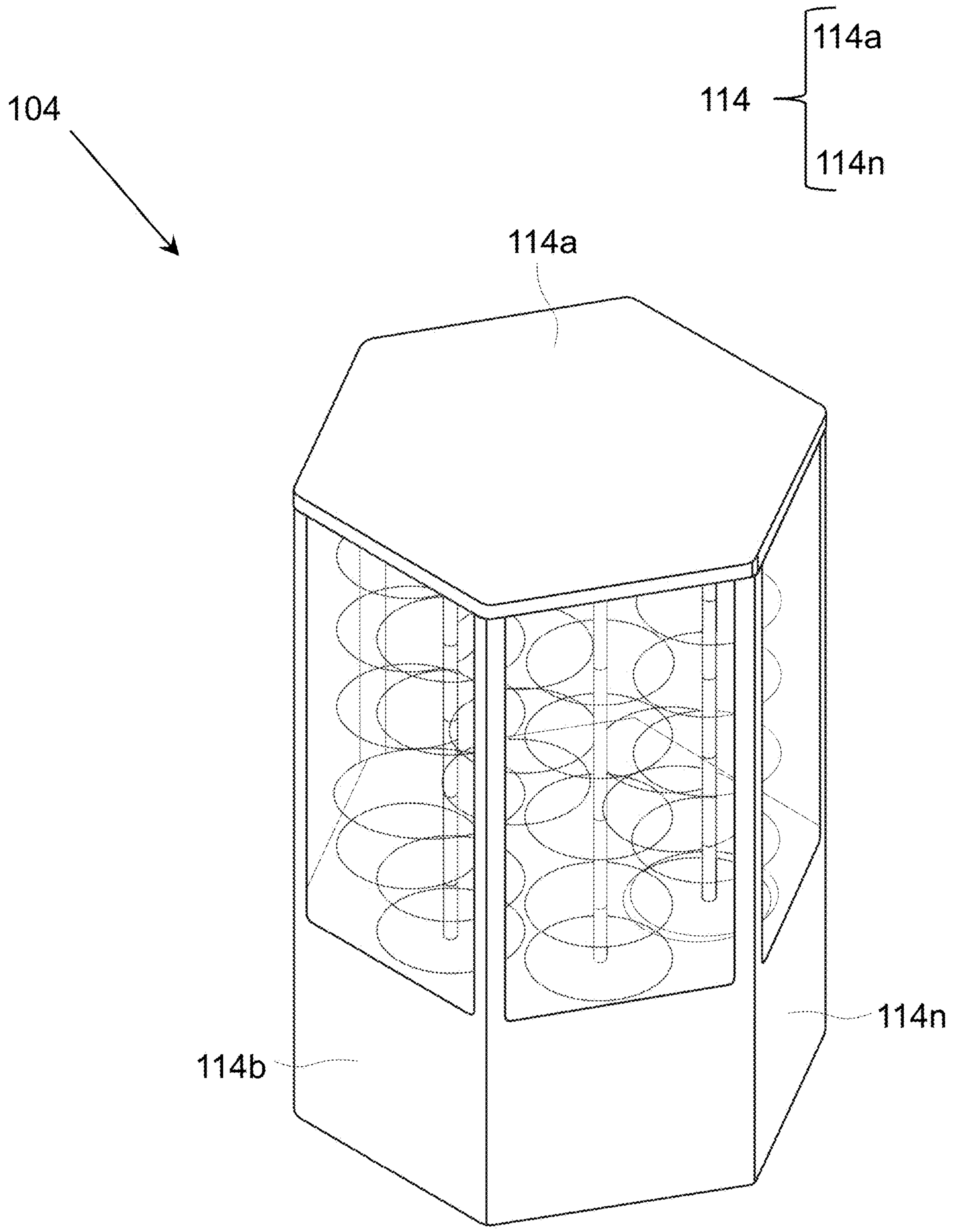
FIG. 1D illustrates a perspective view of another display unit having a regular hexagonal shape, in accordance with an embodiment of the present disclosure.

FIG. 1D illustrates a perspective view of another display unit 103 having a regular hexagonal shape, in accordance with an embodiment of the present disclosure. Specifically, cross-sectional shape of the panels 114 of the display unit 103 may have the regular hexagonal shape.

Figure 2A:
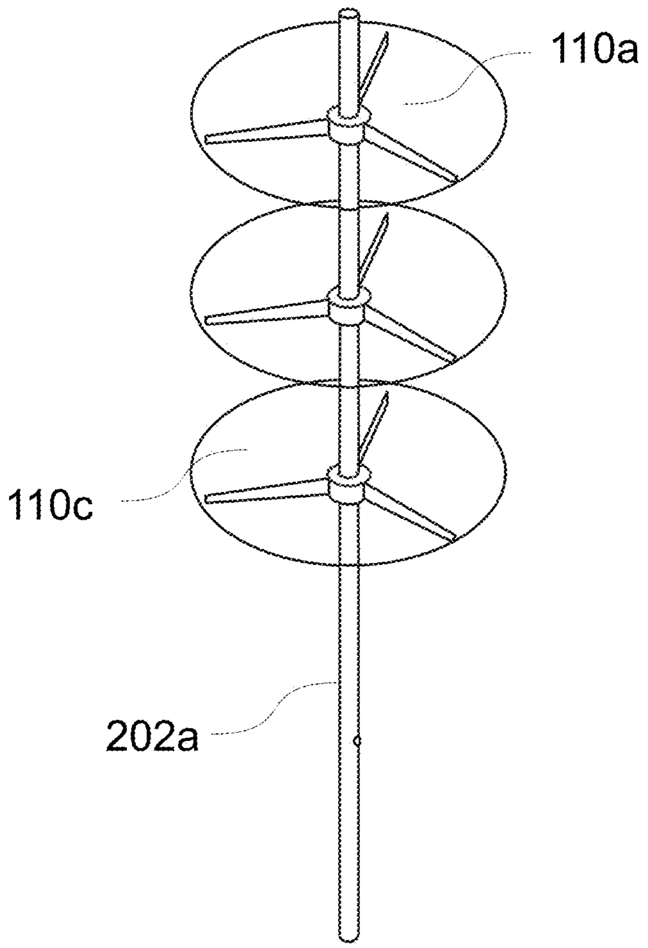
FIG. 2A illustrates a perspective view of a first rod carrying bases, in accordance with an embodiment of the present disclosure.

FIG. 2A illustrates a perspective view of a first rod 202*a* of a plurality of rods 202 carrying bases, in accordance with an embodiment of the present disclosure. In some examples, the first through third bases 110*a*-110*c* of the bases 110 may be coupled to the first rod 202*a*. In some other examples any number of bases may be coupled to the first rod 202*a*. The bases 110 may include a through hole that may be positioned at the center of the bases 110. In other words, each base of the bases 110 may include the through hole that may be positioned at the center of that base of the bases 110. For example, each of the first through third bases 110*a*-110*c* may include the through hole that may be positioned at the center of the first through third bases 110*a*-110*c* such that the first rod 202*a* is inserted through the through holes of the first through third bases 110*a*-110*c*. In other words, to couple the bases 110 with the first rod 202*a*, the first rod 202*a* may be inserted into the through holes of each base of the bases 110.

Although FIG. 2A shows the first rod 202*a*, however, it will be apparent to a person skilled in the art that the scope of the present disclosure is not limited to it. The other rods, for example, second through fourth rods 202*a*-202*d*, may be structurally, functionally, and configurationally same or substantially similar to the first rod 202*a*, as explained hereinabove, without deviating from the scope of the present disclosure. For sake of brevity, the second through fourth rods 202*a*-202*d* are not explained in detail in the present disclosure.

Figure 2B:
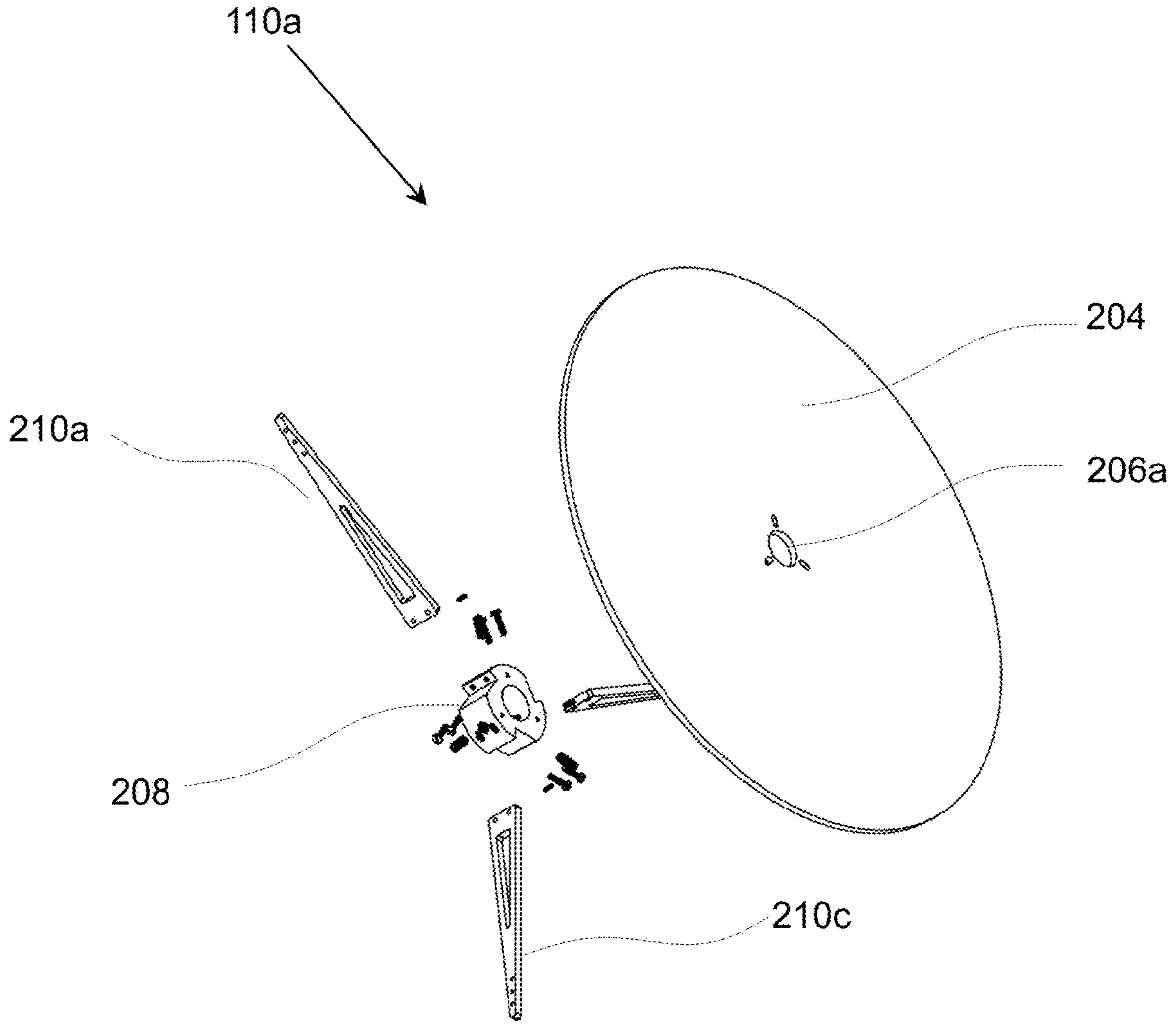
FIG. 2B illustrates a perspective exploded view of a first base of FIG. 2A, in accordance with an embodiment of the present disclosure.

FIG. 2B illustrates a perspective exploded view of the first base 110*a*, in accordance with an embodiment of the present disclosure. The first base 110*a* may include a tray 204, a collar 208, and a plurality of strips 210*a*-210*c* (hereinafter collectively referred to and designated as "the strips 210").

The tray 204 may include a through hole 206*a* that may be positioned at a center of the tray 204. The through hole 206*a* may facilitate the first base 110*a* to couple to the first rod 202*a*. Specifically, the first rod 202*a* may be inserted into the through hole 206*a* to facilitate coupling of the first base 110*a* with the first rod 202*a*. The collar 208 may be disposed beneath the tray 204. The strips 210 may be coupled to the collar 208. The strips 210 may extend along a radial direction of the tray 204. Specifically, the strips 210 may extend along the radial direction of the tray 204 from the collar 208 such that the strips 210 may be spaced apart from each other. The strips 210 may facilitate to provide support to the tray 204.

Although FIG. 2B shows the first base 110*a*, however, it will be apparent to a person skilled in the art that the scope of the present disclosure is not limited to it. The other bases, for example, second and third bases 110*b*, 110*c* may be structurally, functionally, and configurationally same or substantially similar to the first base 110*a*, as explained hereinabove, without deviating from the scope of the present disclosure. For sake of brevity, the second and third bases 110*b*, 110*c* are not explained in detail in the present disclosure.

Figure 2C:
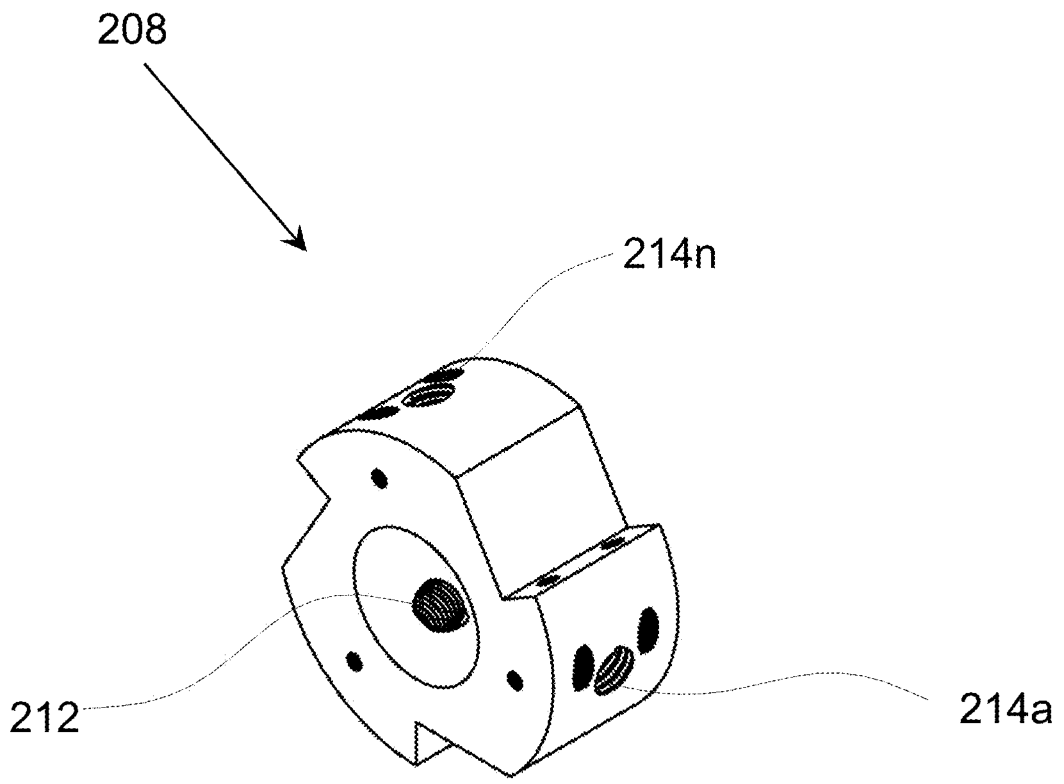
FIG. 2C illustrates a perspective view of a collar of the first base of the FIG. 2B, in accordance with an embodiment of the present disclosure.

FIG. 2C illustrates a perspective view of the collar 208 of the first base 110*a* of the FIG. 2B, in accordance with an embodiment of the present disclosure. The collar 208 may include an opening 212 and a plurality of apertures 214*a*-214*n* (hereinafter collectively referred to and designated as "the apertures 214"). The opening 212 may be disposed at a center of the collar 208. The opening 212 may facilitate the collar 208 to couple to the first rod 202*a*. Specifically, the first rod 202*a* may be inserted into the opening 212 to facilitate coupling of the collar 208 with the first rod 202*a*. The apertures 214 may be disposed at a circumference of the collar 208. The apertures 214 may be adapted to facilitate the strips 210 to couple to the collar 208. Specifically, the apertures 212 may facilitate the strips 210 to couple to the collar 208 such that the strips 210 extend along the radial direction of the tray 204 from the collar 208.

Figure 3A:
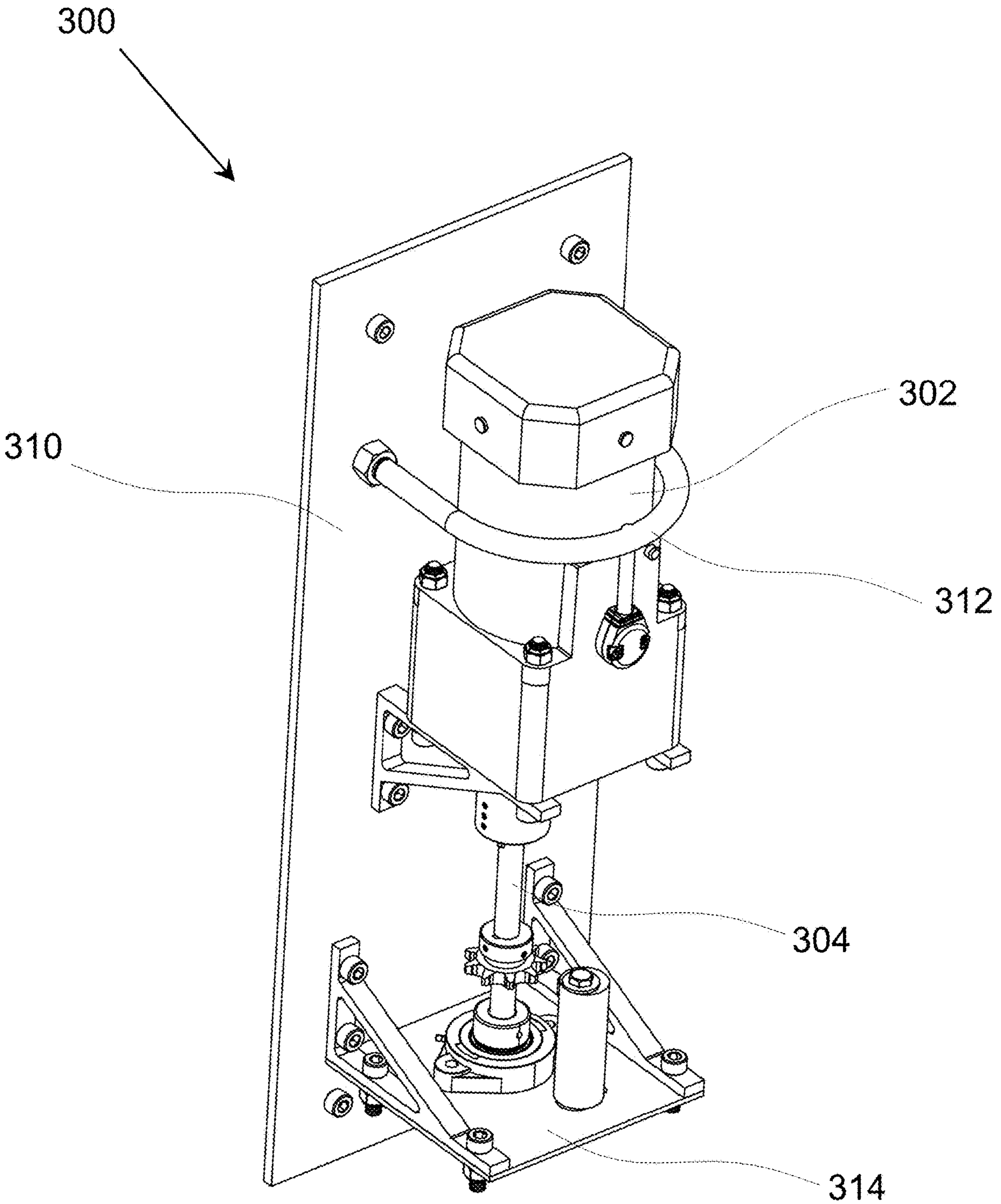
FIG. 3A illustrates a perspective collapsed view of a motor unit associated with the display unit of FIGS. 1A-1D, in accordance with an embodiment of the present disclosure.

FIG. 3A illustrates a perspective collapsed view of a motor unit 300 of the drive mechanism associated with the display unit of FIGS. 1A-1D, in accordance with an embodiment of the present disclosure. The motor unit 300 may be coupled to the primary shaft of the drive mechanism (later shown in FIG. 4A). The motor unit 300 may be adapted to generate a rotational force such that the primary shaft rotates upon generation of the rotational force.

Figure 3B:
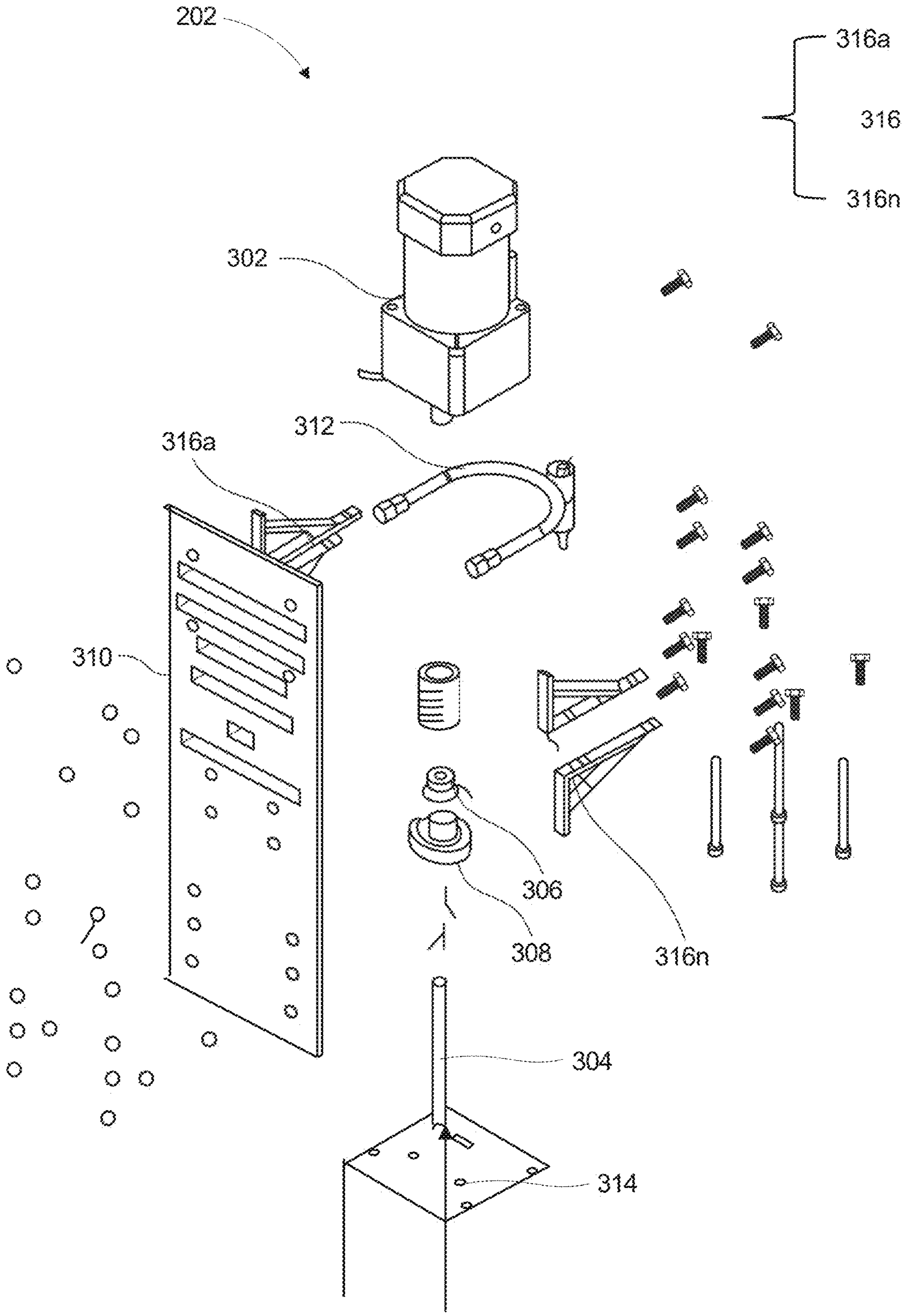
FIG. 3B illustrates a perspective exploded view of the motor unit of FIG. 3A, in accordance with an embodiment of the present disclosure.

FIG. 3B illustrates a perspective exploded view of the motor unit 300 of FIG. 3A, in accordance with an embodiment of the present disclosure. The motor unit 300 may include a motor 302, a motor shaft 304, at least one input drive gear 306, a drive bearing 308, a mounting plate 310, a U-shaped bolt 312, a support plate 314, and a plurality of braces 316*a*-316*n* (hereinafter collectively referred to and designated as "the braces 316").

The motor 302 may be coupled to the mounting plate 310. In other words, the mounting plate 310 may be adapted to firmly/stably hold the motor 302. The mounting plate 310 may be adapted to absorb or mitigate vibrations that may be produced while functioning of the motor 302. The motor 302 may be adapted to generate the rotational force. In some embodiments of the present disclosure, the motor 302 may be adapted to receive an electrical energy from an external source (not shown) such that the motor 302 converts the electrical energy into mechanical energy. This conversion of the electrical energy into the mechanical energy facilitates generation of the rotational force. In some examples of the present disclosure, the external source may be a battery or any other electric device that may produce an electric current.

In some embodiments of the present disclosure, the motor 302 may be one of, a synchronous motor, an asynchronous motor, a brushed motor, a brushless motor, and the like. Embodiments of the present disclosure are intended to include and/or otherwise cover any type of the motor 302, without deviating from the scope of the present disclosure.

The motor shaft 304 may be coupled to the motor 302. The motor shaft 304 may extend along the length of the motor unit 300. The motor shaft 304 may project outwardly from the motor 302. The motor shaft 304 may include first and second ends (not shown) such that the first end may be disposed at an upper side of the motor unit 300 and the second end may be disposed at a lower side of the motor unit 300. The first end of the motor shaft 304 may extend or project outwardly from the motor 302. The lower end of the motor shaft 304 may adjoin with the support plate 314. The motor shaft 304 may be adapted to rotate upon generation of the rotational force by the motor 302. In other words, the motor 302 may be adapted to generate the rotational force to rotate the motor shaft 304.

The at least one input drive gear 306 may be coupled to the motor shaft 304. The at least one input drive gear 306 may include a through hole (not shown). The through hole may be disposed at a center of the at least one input drive gear 306. To couple the at least one input drive gear 306 with the motor shaft 304, the motor shaft 304 may be passed through the through hole of the at least input drive gear 306. The at least input drive gear 306 may be adapted to rotate. Specifically, the at least one input drive gear 306 may be adapted to rotate upon rotation of the motor shaft 304. Since, the at least one input drive gear 306 is fixedly connected to the motor shaft 304, therefore, upon rotation of the motor shaft 304, the at least one input drive gear 306 also rotates.

In some embodiments of the present disclosure, the at least one input drive gear 306 may include one of a worm gear or a pinion bevel gear. Embodiments of the present disclosure are intended to include or otherwise cover any type of input drive gear including known, related art, and/or later developed gears without deviating from the scope of the present disclosure.

Further, the at least one input drive gear 306 may be in mesh engagement with at least one driven output gear of the drive mechanism. Upon rotation of the at least one input drive gear 306, the at least one input drive gear 306 may be adapted to rotate the at least one driven output gear. In some embodiments of the present disclosure, the at least one driven output gear may include one of a worm wheel gear or a driven bevel gear. Embodiments of the present disclosure are intended to include or otherwise cover any type of driven output gear including known, related art, and/or later developed gears without deviating from the scope of the present disclosure.

Although FIG. 3B illustrates one input drive gear (i.e., the at least one input drive gear 306), it will be apparent to a person skilled in the art that the scope of the present disclosure is not limited to it. In various other aspects, the number of input drive gears may be more than one, without deviating from the scope of the present disclosure. In such a scenario, each input drive gear is configured to perform one or more operations in a manner similar to the operations of the at least one input drive gear 306 as described herein.

Similarly, although the at least one driven output gear is described above, it will be apparent to a person skilled in the art that the scope of the present disclosure is not limited to it. In various other aspects, the number of driven output gear may be more than one, without deviating from the scope of the present disclosure. In such a scenario, each driven output gear is configured to perform one or more operations in a manner similar to the operations of the at least one driven output gear as described herein.

The drive bearing 308 may be mounted on the support plate 312. The drive bearing 308 may be disposed at an end of the motor shaft 304. In other words, the end of the motor shaft 304 may be inserted into the drive bearing 308. The drive bearing 308 may facilitate rotation of the motor shaft 304. Specifically, a rotating element of the drive bearing 308 may facilitate rotation of the motor shaft 304. The drive bearing 308 may facilitate rotation of the motor shaft 304 upon generation of the rotational force by the motor 302.

The mounting plate 310 may be disposed ahead of the motor unit 300. The mounting plate 310 may be a slab like structure that may extend along a length of the motor unit 300. The mounting plate 310 may be adapted to mount the motor unit 300 to any surface. Specifically, the mounting plate 310 may facilitate to mount the motor unit 300 at the lower portion of the cabinet 108. The mounting plate 310 may further facilitate to protect other components of the motor unit 300. For example, the mounting plate 310 may facilitate to protect the motor 302, the motor shaft 304, the drive sprocket 306, and the drive bearing 308 of the motor unit 202.

In some embodiments of the present disclosure, the mounting plate 310 may be made up of a material including, but not limited to, steel, iron, aluminium, plastic, and the like. Embodiments of the present disclosure are intended to include and/or otherwise cover any type of material for the mounting plate 310, without deviating from the scope of the present disclosure.

The U-shaped bolt 312 may be disposed around the motor 302. The U-shaped bolt 312 may be coupled to the motor 302 and the mounting plate 310. One side of the U-shaped bolt 312 may cover the motor 302 and another side of the U-shaped bolt 312 may be coupled to the mounting plate 310. To hold the motor 302 with the mounting plate 310, a U-shaped portion of the U-shaped bolt 312 may abut the motor 302 and straight ends of the U-shaped bolt 312 may be coupled to the mounting plate 310. Thus, the U-shaped bolt 312 may be adapted to hold the motor 302 along-with the mounting plate 310. Specifically, the U-shaped bolt 312 may be adapted to firmly/stably hold the motor 302 with the mounting plate 310. The U-shaped bolt 312 may further facilitate to eliminate the vibrations that may be produced by the motor 302 while the motor 302 generates the rotational force.

The support plate 314 may be disposed at the lower side of the motor unit 300. The support plate 314 may be a slab like structure that may be coupled to the mounting plate 310. Specifically, the support plate 314 may be positioned or arranged in a perpendicular configuration with respect to the mounting plate 310. The support plate 314 may be adapted to hold or carry one or more components of the motor unit 300.

The braces 316 may be coupled to the motor 302, the mounting plate 310, and the support plate 314. Specifically, the braces 316 may be coupled to the motor 302 and the support plate 314 by way of a suitable fastening means. In some examples, the suitable fastening means may include, but not limited to, a nut, a bolt, a rivet, and the like. Embodiments of the present disclosure are intended to include and/or otherwise cover any type of known and later developed fastening means, without deviating from the scope of the present disclosure. Each brace of the braces 316 may have an angled structure that may facilitate to support one or more components of the motor unit 202. The braces 316 may be adapted to support the motor 302 and the support plate 314. Specifically, one pair of braces of the braces 316 may be adapted to support the motor 302 and another pair of braces of the braces 316 may be adapted to support the support plate 314. For example, the first and second braces 316*a*, 316*b* may be adapted to support the motor 302 and the third and fourth braces 316*c*, 316*d* may be adapted to support the support plate 314.

Figure 4A:
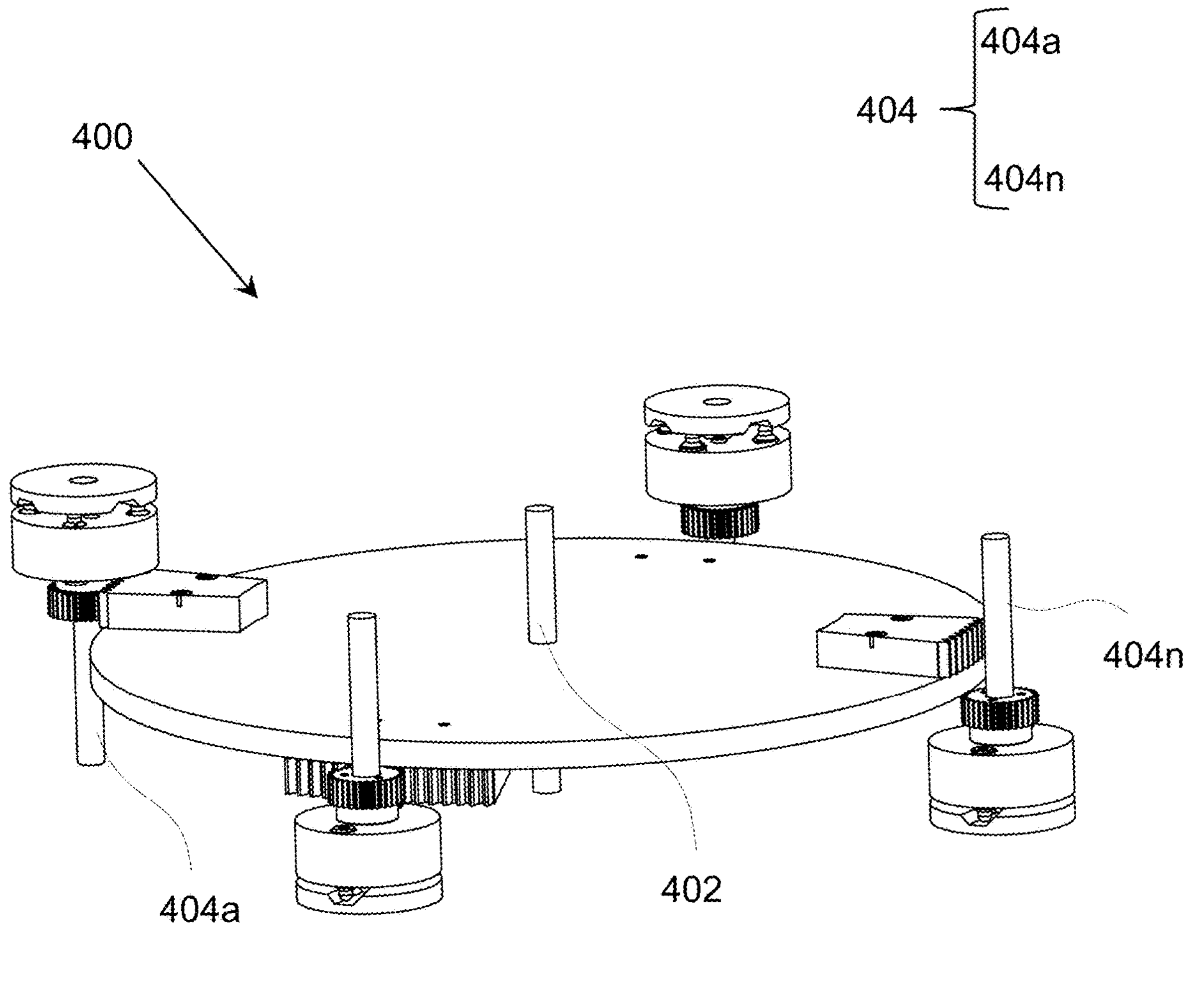
FIG. 4A illustrates a collapsed perspective view of an arrangement of a drive mechanism of the display unit of FIG. 1A, in accordance with an embodiment of the present disclosure.

FIG. 4A illustrates a collapsed perspective view of an arrangement of a drive mechanism 400 of the display unit 100 of FIG. 1A, in accordance with an embodiment of the present disclosure. The drive mechanism 400 may be disposed in the lower portion of the cabinet 108. The drive mechanism may include a primary shaft 402. The primary shaft 402 may be coupled to the motor unit 300 and adapted to rotate upon rotation of the motor shaft 304. Specifically, the primary shaft 402 may include a driven output gear (not shown) that is in mesh engagement with the input drive gear 306 coupled to the motor shaft 304 that facilitates the primary shaft 402 to rotate upon rotation of the motor shaft 304. The drive mechanism may further include a plurality of secondary shafts 404*a*-404*n* (hereinafter collectively referred as "the secondary shafts 404). The secondary shafts 404 may adapted to be rotated intermittently upon rotation of the primary shaft 402.

Figure 4B:
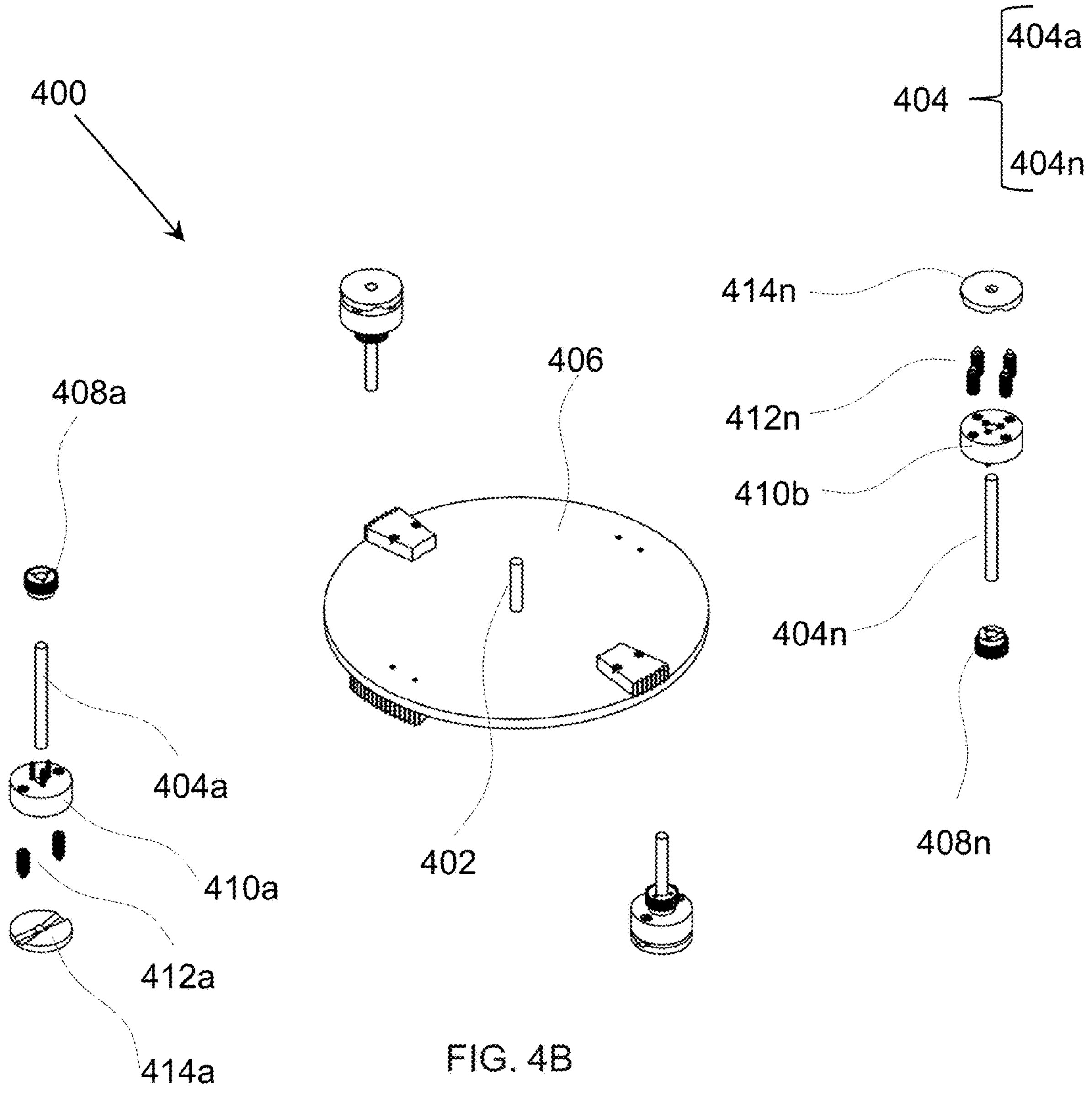
FIG. 4B illustrates an exploded perspective view of the arrangement of the drive mechanism of FIG. 4A, in accordance with an embodiment of the present disclosure.

FIG. 4B illustrates an exploded perspective view of the arrangement of the drive mechanism of FIG. 4A, in accordance with an embodiment of the present disclosure. The drive mechanism may further include an assembly 406 of holding plate coupled to the plurality of partially toothed gears, a plurality of fully toothed gears 408*a*-408*n* (hereinafter collectively referred as "the fully toothed gears 408"), a first set plurality of plunger holding plates 410*a* and a second set of plunger holding plates 410*b* (hereinafter collectively referred as "the plunger holding plates 410"), a plurality of spring loaded ball plungers 412*a*-412*n* (hereinafter collectively referred as "the spring loaded ball plungers 412"), and a plurality of plates 414*a*-414*n* (hereinafter collectively referred as "the plates 414"). In assembly, the primary shaft 402 is coupled to the assembly 406 of holding plate coupled to the plurality of partially toothed gears. Further, in assembly, each secondary shaft of the secondary shafts 404 is coupled to, each fully toothed gear of the plurality of fully toothed gears 408, each plunger holding plate of the plurality of plunger holding plates 410, and each plate of the plurality of plates 414. Further, each fully toothed gear of the plurality of fully toothed gears 408 is adapted to be coupled to each plunger holding plate of the plurality of plunger holding plates 410. Specifically, each fully toothed gear of the plurality of fully toothed gears 408 is coupled to each plunger holding plate of the plurality of plunger holding plates 410 by way of fasteners (not shown). Further, each plunger holding plate of the plurality of plunger holding plates 410 is adapted to hold spring loaded ball plungers 412. The plates 404 are coupled to the plurality of secondary shafts 404. The spring loaded ball plunges are in constant contact with plates 410 during the rotation of each fully toothed gear of the plurality of fully toothed gears 408.

Figure 5A:
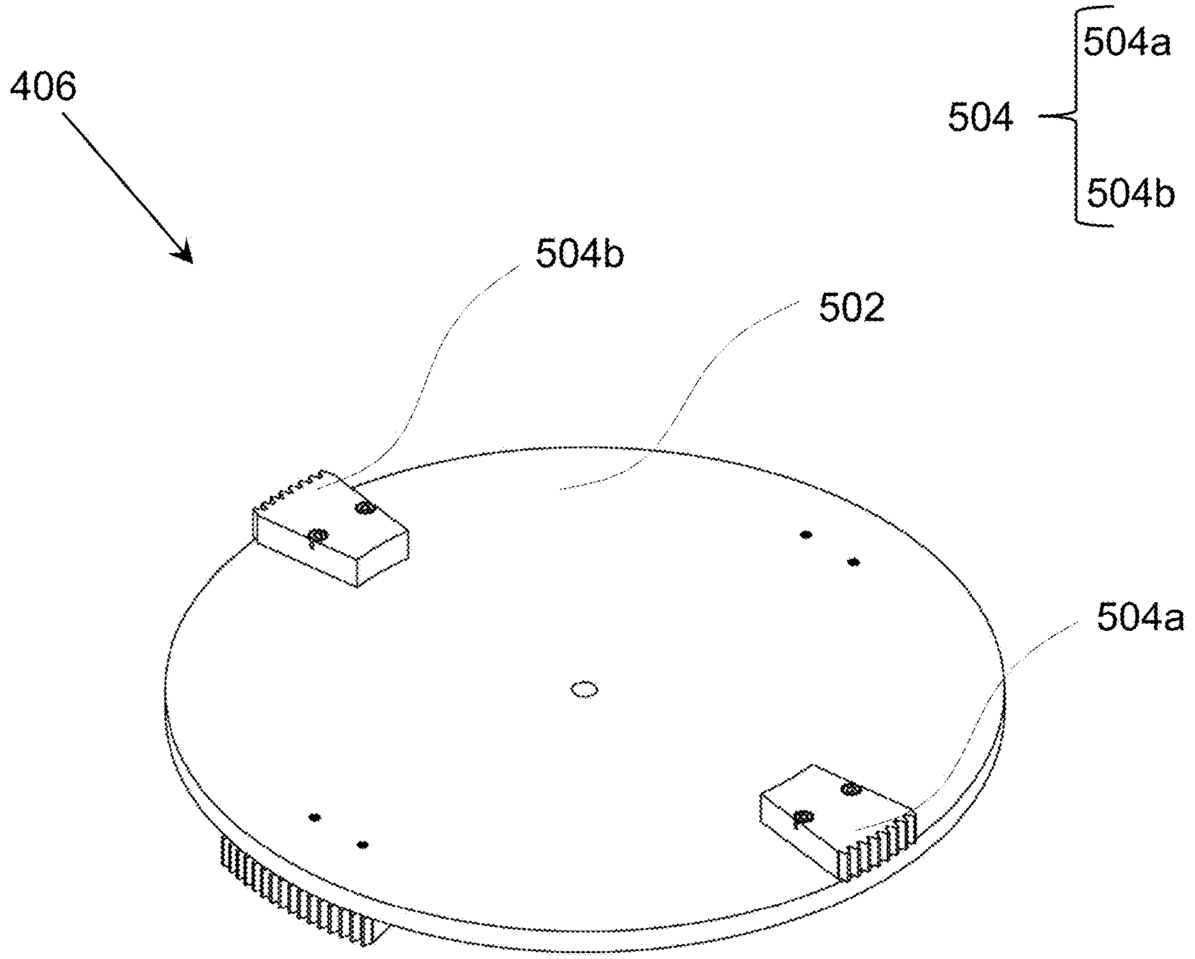
FIG. 5A illustrates a collapsed perspective view of an assembly of a holding plate coupled to a plurality of partially toothed gears of FIGS. 4A-4B, in accordance with an embodiment of the present disclosure.

FIG. 5A illustrates a collapsed perspective view of the assembly 406 of the holding plate coupled to the plurality of partially toothed gears of FIGS. 4A-4B, in accordance with an embodiment of the present disclosure. The assembly 406 may include a holding plate 502 and a first set of partially toothed gears 504*a*-504*b* (hereinafter collectively referred as "the first partially toothed gears 504"). The first partially toothed gears 504 may adapted to be coupled to the holding plate 502. Specifically, the first partially toothed gears 504 may be coupled to the holding plate 502 by way of the plurality of fasteners (later shown in FIG. 5B).

Figure 5B:
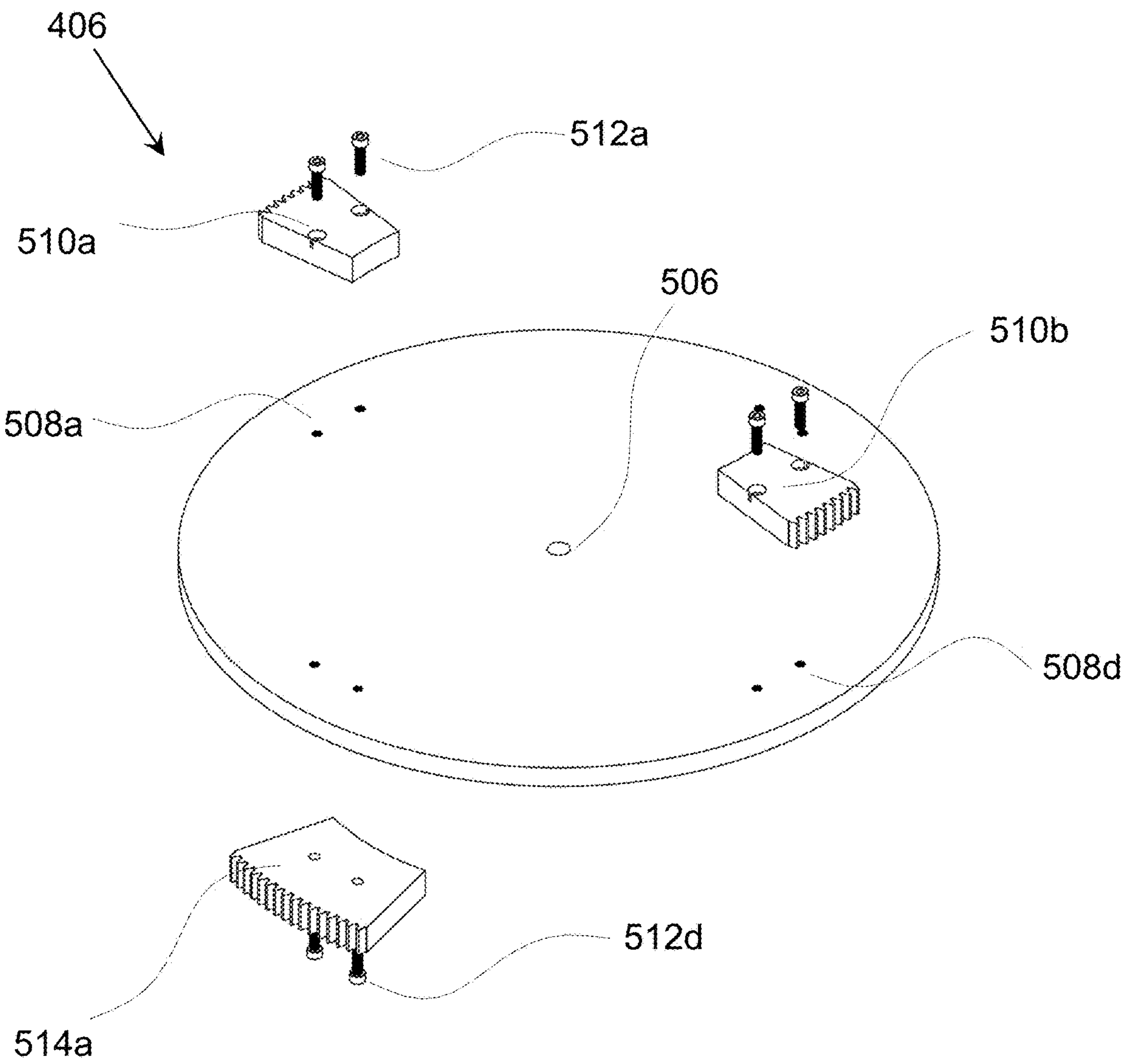
FIG. 5B illustrates an exploded perspective view of the assembly 406 of the holding plate coupled to the plurality of partially toothed gears of FIGS. 5A-5B, in accordance with an embodiment of the present disclosure.

FIG. 5B illustrates an exploded perspective view of the assembly 406 of the holding plate 502 coupled to the plurality of partially toothed gears of FIG. 5A, in accordance with an embodiment of the present disclosure. The holding plate 502 of the assembly 406 may further include a hole 506. The hole 506 may facilitate in coupling of the holding plate 502 with the primary shaft 402. The holding plate may include a plurality of pair of holes 508*a*-508*d* (hereinafter collectively referred as "the pair of holes 508"). The first partially toothed gears 504 may include a plurality of pair of holes 510*a*-510*b* (hereinafter collectively referred as "the pair of holes 510"). The pair of fasteners 512*a*-512*b* (hereinafter collectively referred as "the pair of fasteners 512") may facilitate in coupling the first partially toothed gears 504 with the holding plate 502 upon insertion of the pair of fasteners 512 into the pair of holes 510 and the pair of holes 508. The assembly 406 further include a second set of partially toothed gears 514*a*-514*b* (hereinafter collectively referred as "second partially toothed gears 514").

Figure 6:
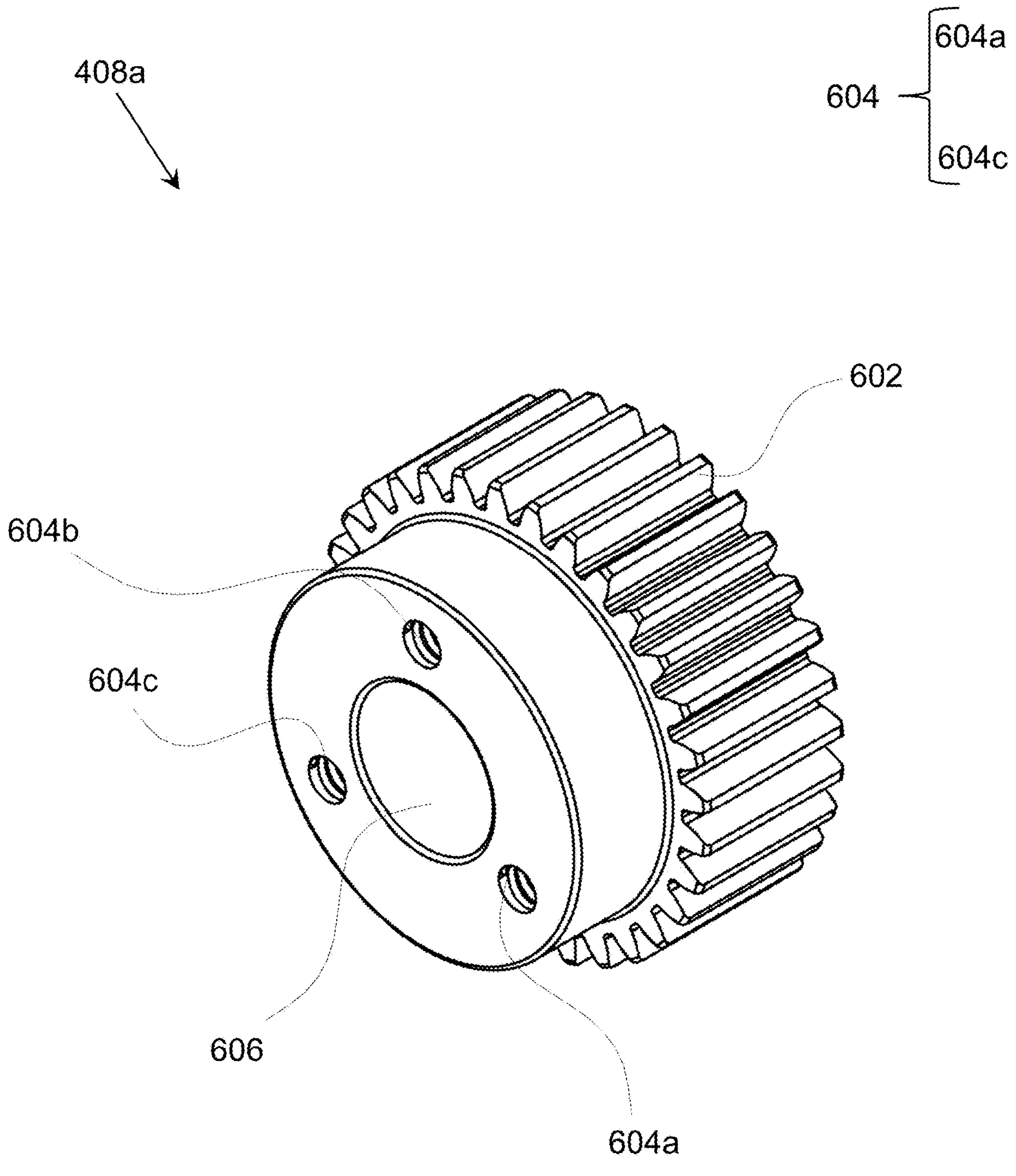
FIG. 6 illustrates a perspective view a fully toothed gear of FIGS. 4A-4B, in accordance with an embodiment of the present disclosure.

FIG. 6 illustrates a perspective view a fully toothed gear 408*a* of FIGS. 4A-4B, in accordance with an embodiment of the present disclosure. In some embodiments of the present disclosure, the fully toothed gear 408*a* may be a spur gear. Aspects of the present disclosure are intended to include or otherwise cover any type of fully toothed gear without deviating from the scope of the present disclosure. In some embodiments of the present disclosure, the fully toothed gear 408*a* may include a plurality of gear teeth 602. In some embodiments of the present disclosure, the plurality of gear teeth 602 of the fully toothed gear 410*a* may have one of an involute tooth profile or a cycloid tooth profile. Aspects of the present disclosure are intended to include or otherwise cover any profile of the fully toothed gear without deviating from the scope of the present disclosure. In a preferred embodiments of the present disclosure a total count of the plurality of teeth 602 may be thirty-two in numbers. Aspects of the present disclosure are intended to include or otherwise cover any number of teeth of the fully toothed gear without deviating from the scope of the present disclosure. The fully toothed gear 408*a* may include a plurality of threaded holes 604*a*-604*c* (hereinafter collectively referred as "the threaded holes 604"). The threaded holes 604 may be adapted to couple the each plunger plate of the plunger holding plates 410. The fully toothed gear 408*a* may further include a hole 606 at the central portion. The hole 606 may be facilitate in coupling each fully toothed gear of the fully toothed gears 408 to each secondary shaft of the plurality of secondary shafts 404.

Figure 7A:
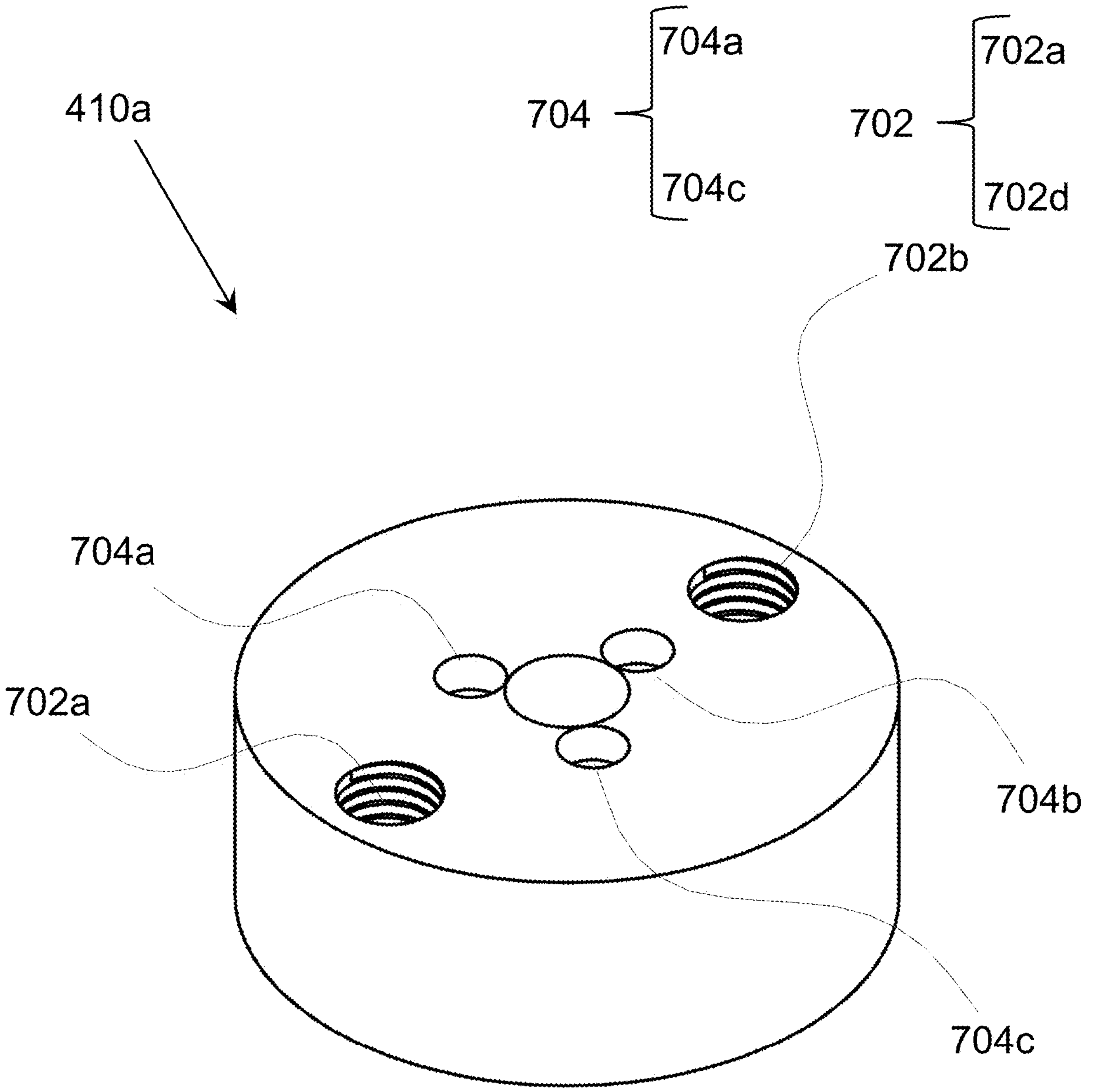
FIG. 7A illustrates a perspective view of a plunger holding plate of FIGS. 4A-4B, in accordance with an embodiment of the present disclosure.

FIG. 7A illustrates a perspective view of a plunger holding plate 410*a*, in accordance with an embodiment of the present disclosure. The plunger holding plate 410*a* may include a plurality of threaded holes 702*a*-702*b* (hereinafter collectively referred as "the threaded holes 702"). The threaded holes 702 may be adapted to hold the spring loaded ball plungers 412. The plunger holding plate 410*a* may further include three tholes 704*a*-704*c*. The three tholes 704*a*-704*c* may be adapted to couple each fully toothed gear of the fully toothed gears 408 to each plunger holding plate of the plurality of plunger holding plates 410.

Figure 7B:
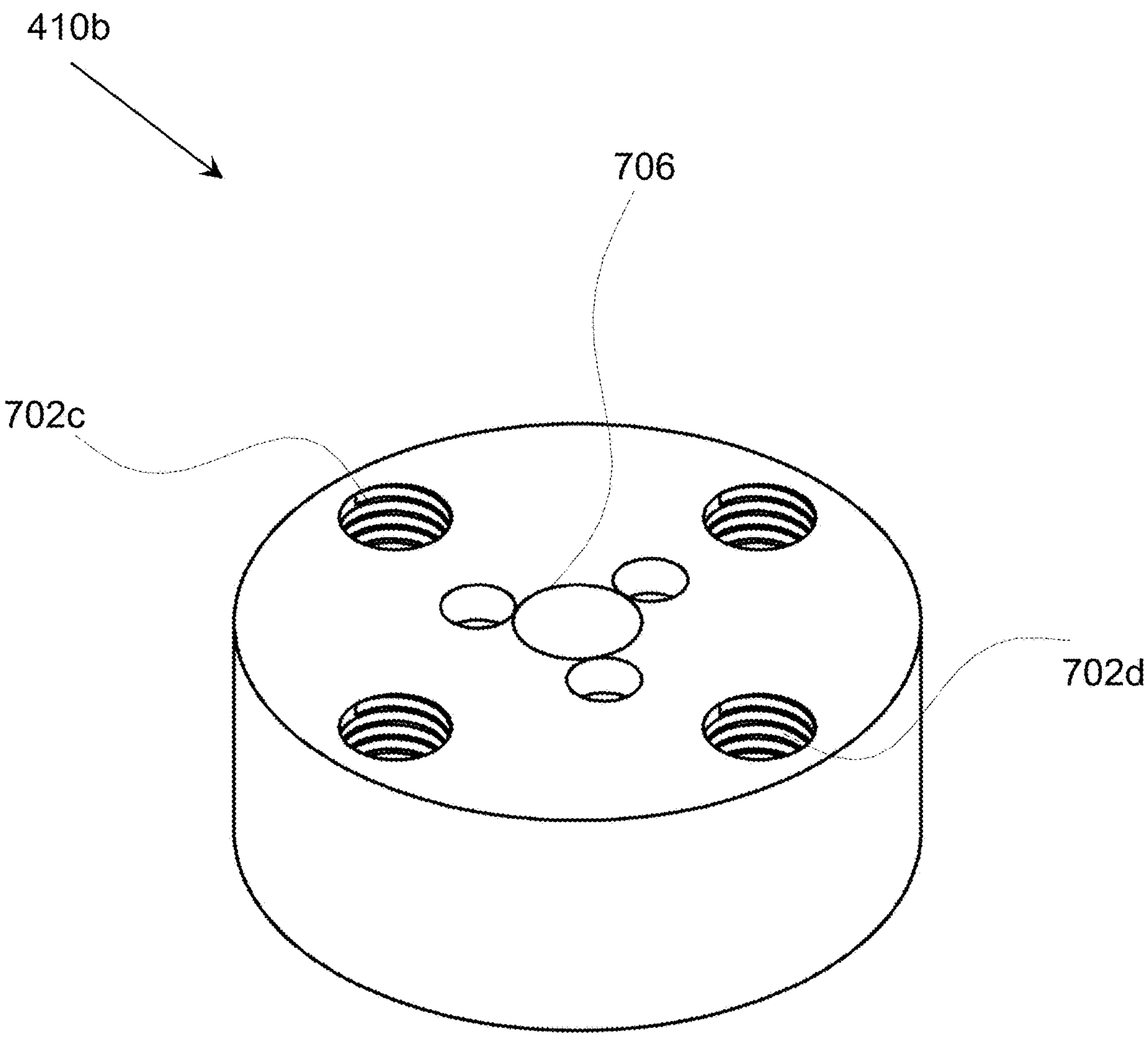
FIG. 7B illustrates a perspective view of plunger holding plate of FIGS. 4A-4B, in accordance with an embodiment of the present disclosure.

FIG. 7B illustrates a perspective view of another plunger holding plate 410*b* of FIGS. 4A-4B, in accordance with an embodiment of the present disclosure. The plunger holding plate 410*b* may include four threaded holes 702 that are adapted to hold the spring loaded ball plungers 412. The plunger holding plate 410*b* may further include a hole 706 in the central region, that is adapted to couple each plunger holding plate of the plunger holding plates 410 to each secondary shaft of the plurality of secondary shafts 404.

Figure 8A:
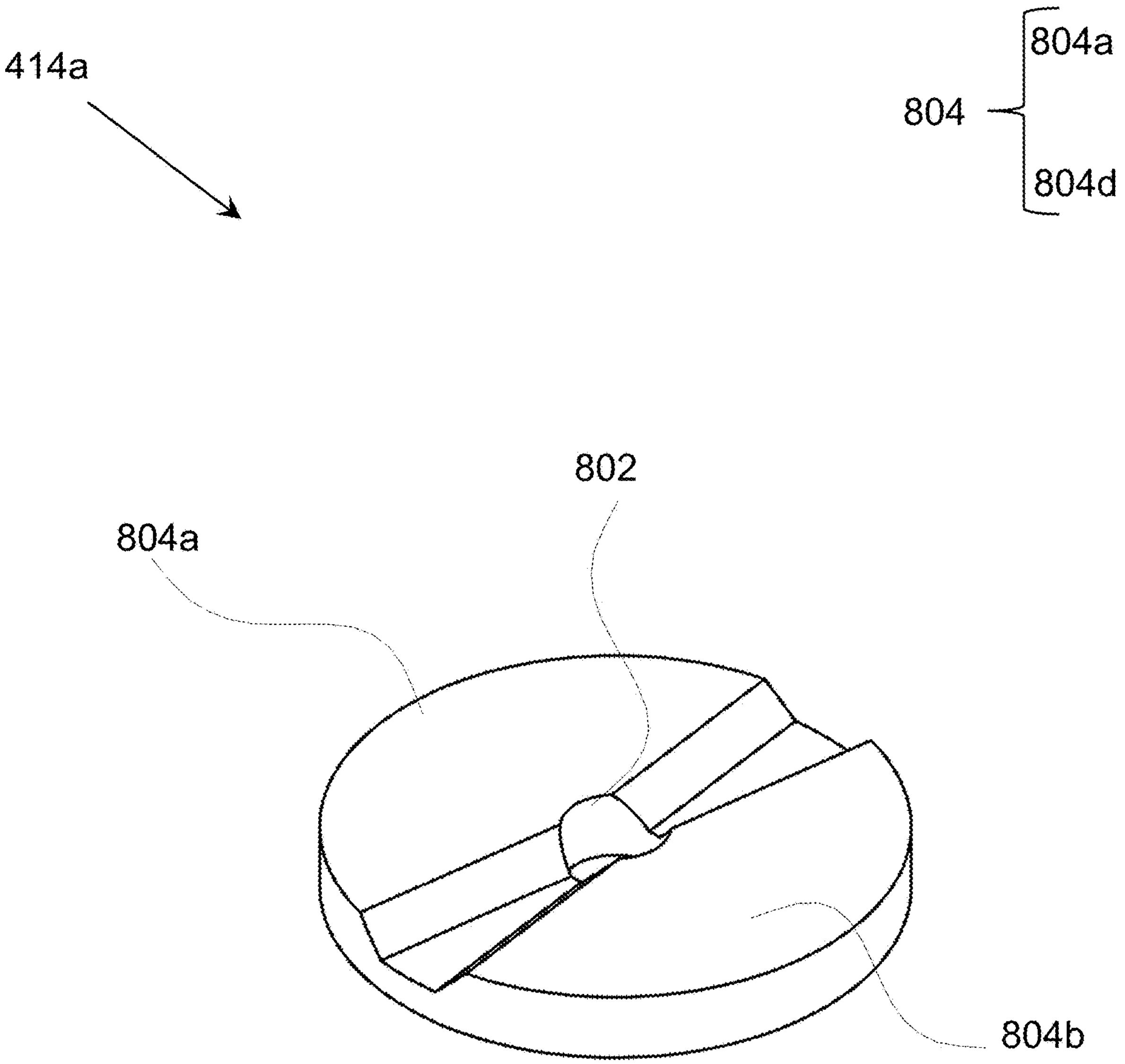
FIG. 8A illustrates a perspective view of a plate with flat surface, in accordance with an embodiment of the present disclosure.

FIG. 8A illustrates a perspective view of a plate 414*a* with flat surface, in accordance with an embodiment of the present disclosure. The plate 414*a* may include surface 804*a*-804*b* such that the surfaces 804*a* and 804*b* are separated by a recess formed therebetween. The surfaces 804*a* and 804*b* plate may be adapted to be in constant contact with the spring loaded ball plungers 412. Specifically, the surfaces 804*a* and 804*b* plate may be adapted to be in constant contact with the ball portions of the spring loaded ball plungers 412.

Figure 8B:
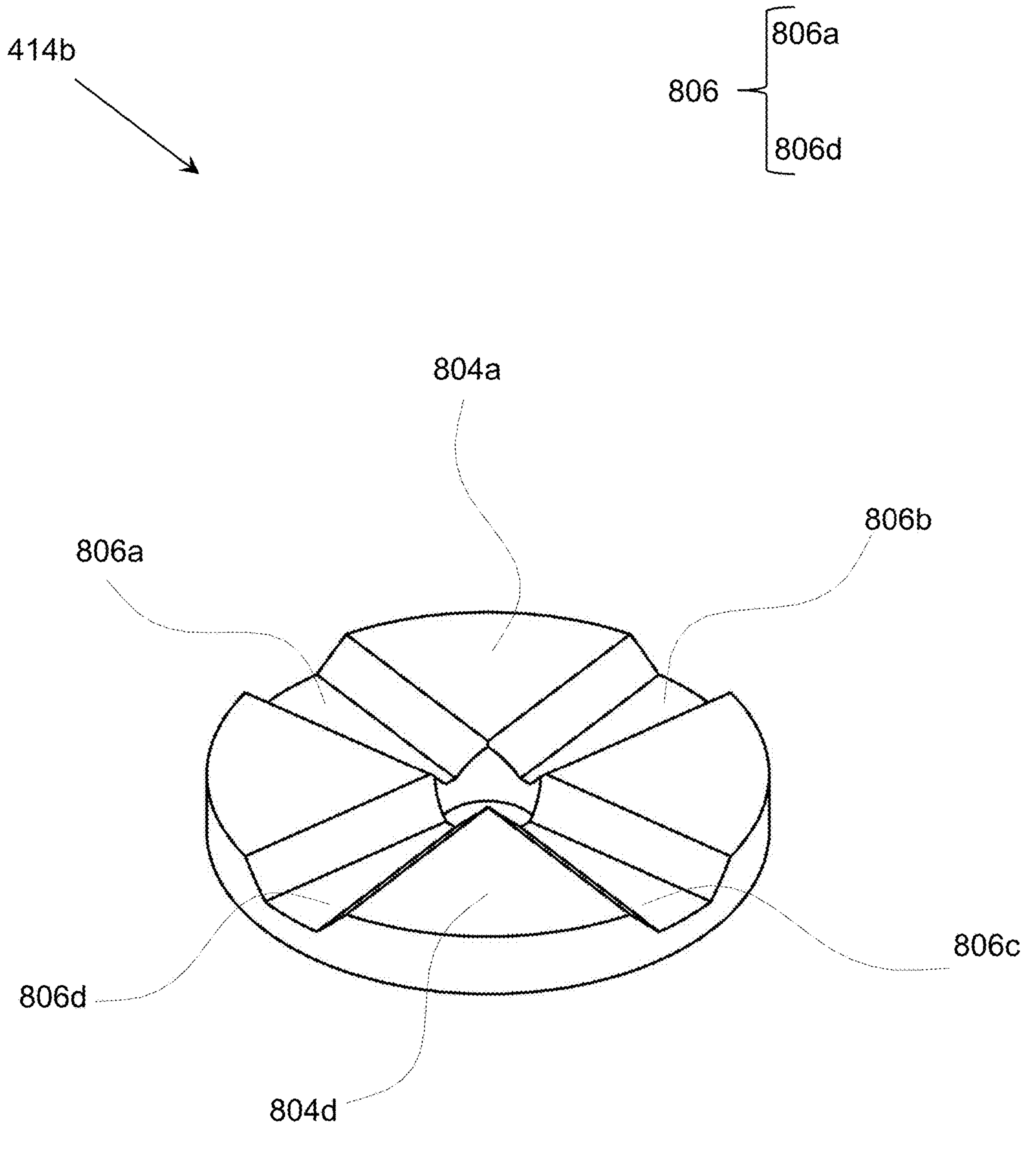
FIG. 8B illustrates a perspective view of another plate with flat surface, in accordance with an embodiment of the present disclosure.
Figure 9:
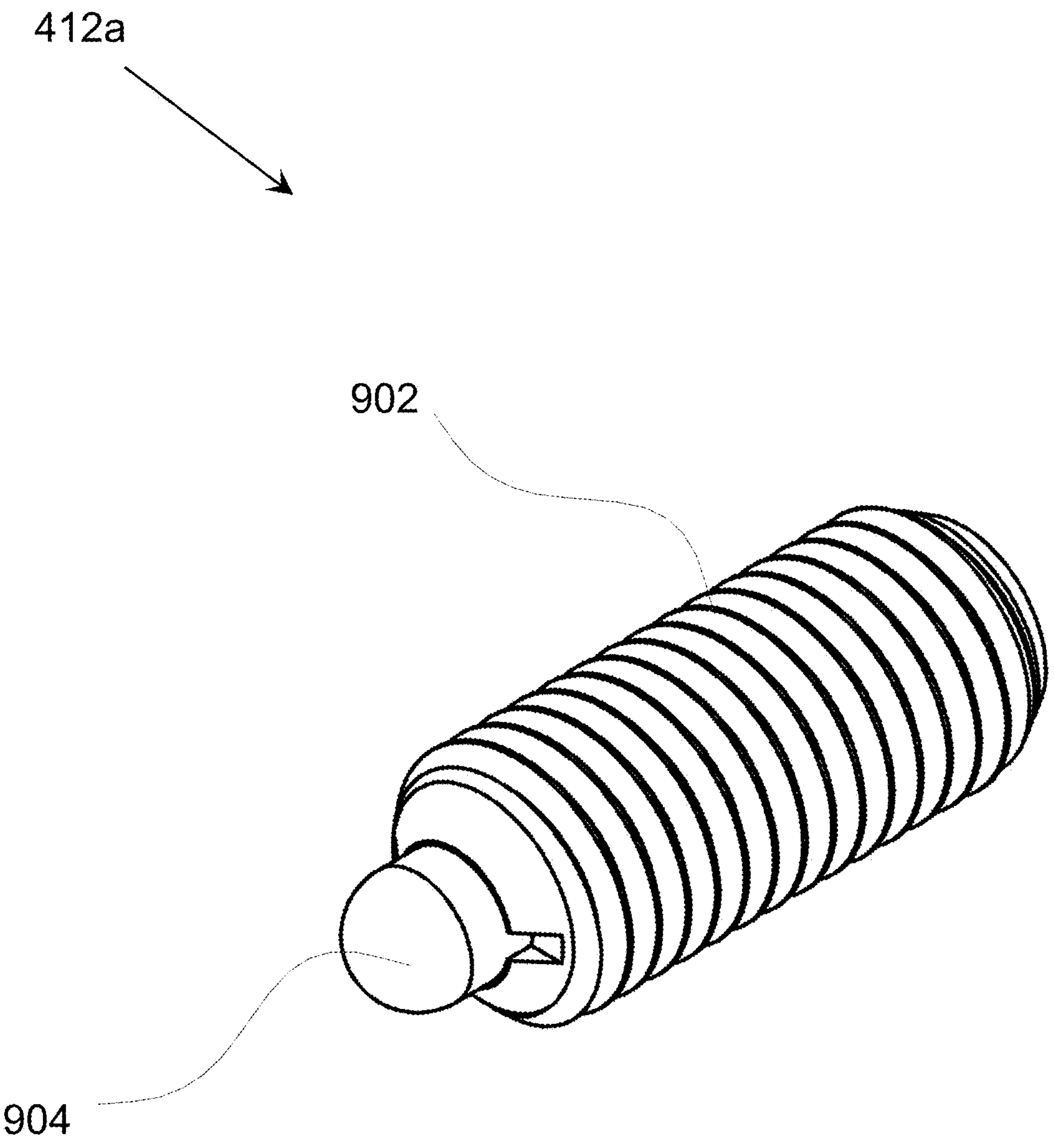
FIG. 9 illustrates a perspective view of a spring loaded ball plunger, in accordance with an embodiment of the present disclosure.

FIG. 8B illustrates a perspective view of another plate 414*b* with flat surface, in accordance with an embodiment of the present disclosure. The plate 414*b* may include surfaces 804*a*-804*d* such that the surfaces 804*a*-804*d* are separated by a recess formed therebetween. The surfaces 804*a*-804*d* of the plate 414*b* may be adapted to be in constant contact with the spring loaded ball plungers 412. Specifically, the surfaces 804*a*-804*d* of the plate 414*b* may be adapted to be in constant contact with the ball portions of the spring loaded ball plungers 412 while the fully toothed gears 408 rotate. FIG. 9 illustrates a perspective view of a spring loaded ball plunger 412*a*, in accordance with an embodiment of the present disclosure. The spring loaded ball plunger 412*a* may include a threaded portion 902 formed on the cylindrical surface of the spring loaded ball plunger 412*a*. Further, the spring loaded ball plunger 412*a* may include a ball portion 904 that is adapted to be in constant contact with the surfaces 804*a*-804*d* of the plates 414*b* while the fully toothed gears 408 rotate.

Figure 10A:
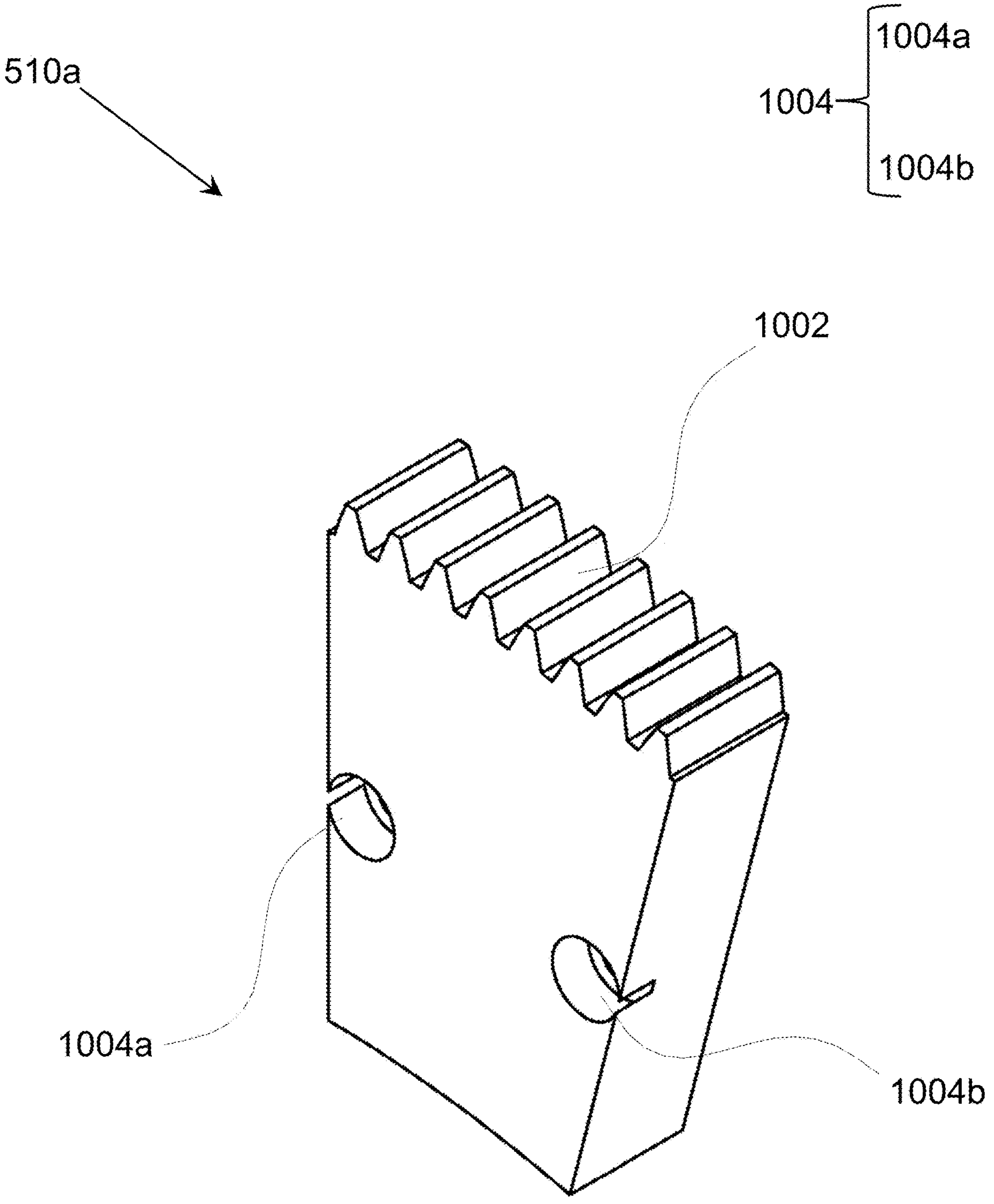
FIG. 10A illustrates a perspective view of a quarter turn partially toothed gear, in accordance with an embodiment of the present disclosure.

FIG. 10A illustrates a perspective view of a quarter turn partially toothed gear 510*a*, in accordance with an embodiment of the present disclosure. The quarter turn partially toothed gear 510*a* may include a plurality of teeth 1002. The plurality of teeth 1002 may be in a mesh engagement with the plurality of teeth 602 of each fully teeth gear of the fully teeth gears 408. In a preferred embodiment of the present disclosure, a total count of teeth on the quarter turn partially toothed gear 510*a* may be eight in numbers. Aspects of the present disclosure are intended to include or otherwise cover any number of teeth on the quarter turn partially toothed gear without deviating from the scope of the present disclosure. The quarter turn partially toothed gear 510*a* may be adapted to turn each fully toothed gear of the fully toothed gears 408 a quarter turn at a time. The quarter turn partially toothed gear 510*a* may further include a couple of holes 1004*a* and 1004*b* such that the couple of holes 1004*a* and 1004*b* may be adapted to be coupled to the holding plate 406.

Figure 10B:
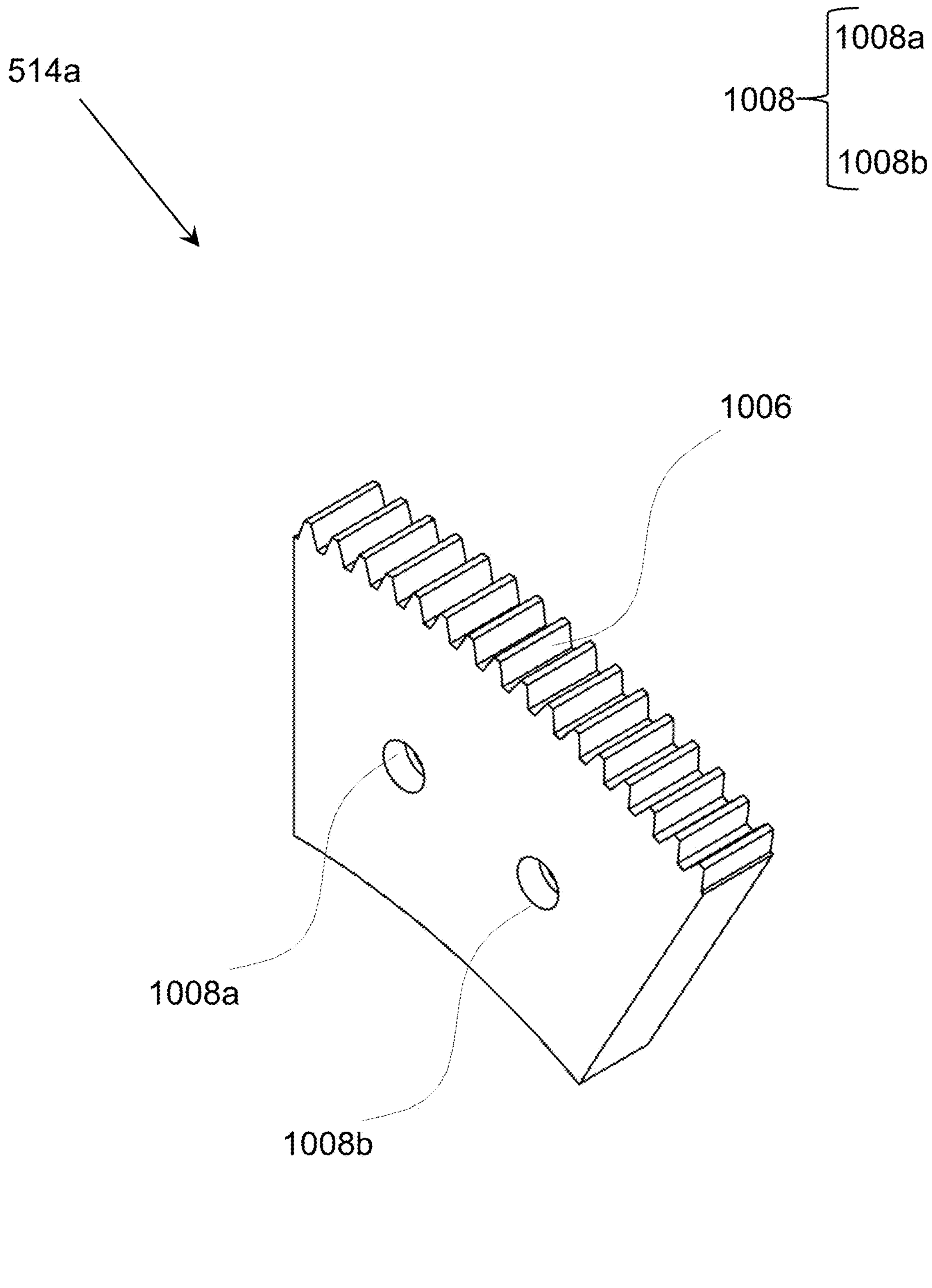
FIG. 10B illustrates a perspective view of a half turn partially toothed gear, in accordance with an embodiment of the present disclosure.

FIG. 10B illustrates a perspective view of a half turn partially toothed gear 514*a*, in accordance with an embodiment of the present disclosure. The half turn partially toothed gear 514*a* may include a plurality of teeth 1008. The plurality of teeth 1008 may be in a mesh engagement with the plurality of teeth 602 of each fully teeth gear of the fully teeth gears 408. In a preferred embodiment of the present disclosure, a total count of teeth on the half turn partially toothed gear 514*a* may be sixteen in numbers. Aspects of the present disclosure are intended to include or otherwise cover any number of teeth on the half turn partially toothed gear without deviating from the scope of the present disclosure. The half turn partially toothed gear 514*a* may be adapted to turn each fully toothed gear of the fully toothed gears 408*a* half turn at a time. The half turn partially toothed gear 514*a* may further include a couple of holes 1008*a* and 1008*b* such that the couple of holes 1008*a* and 1008*b* may be adapted to be coupled to the holding plate 406.

Figure 11A:
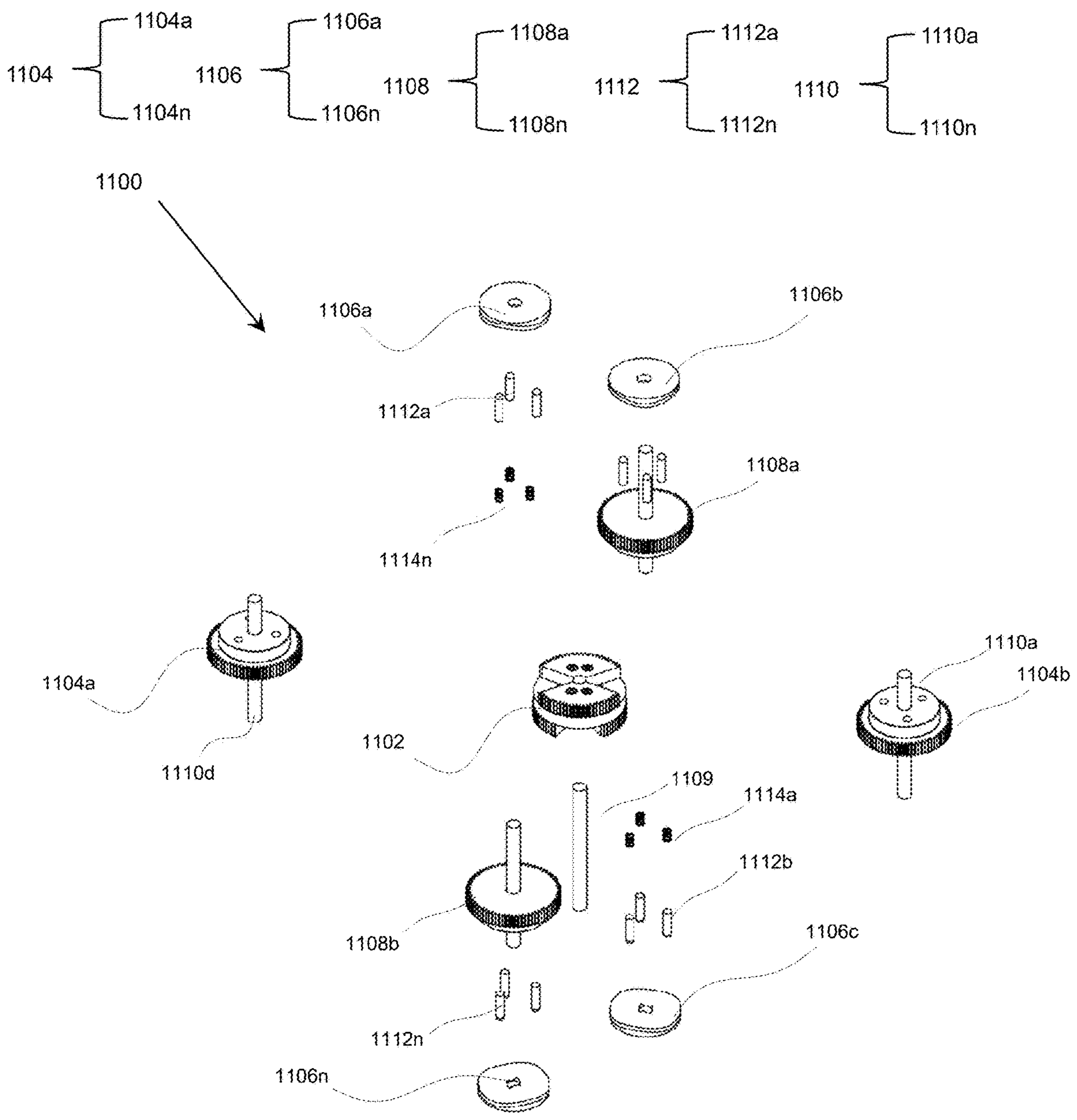
FIG. 11A illustrates an exploded perspective view of another arrangement of a drive mechanism of the display unit of FIG. 1A, in accordance with an embodiment of the present disclosure.

FIG. 11A illustrates an exploded perspective view of another arrangement of a drive mechanism 1100 of the display unit of FIG. 1A, in accordance with an embodiment of the present disclosure. The drive mechanism 1100 may include a primary shaft 1109 adapted to be coupled to an assembly 1102 of the four partially toothed gears with holding plate. The drive mechanism 1100 may further include a plurality of secondary shafts 1110*a*-1110*n* (hereinafter collectively referred as "the secondary shafts 1110") that are adapted to be coupled to a first set of plurality of fully toothed gears 1104*a*-1104*n* (hereinafter collectively referred as "the first fully toothed gears 1104"). The plurality of secondary shafts 1110*a*-1110*n* (hereinafter collectively referred as "the secondary shafts 1110") that are adapted to be coupled to a second set of plurality of fully toothed gears 1108*a*-1108*n* (hereinafter collectively referred as "the second fully toothed gears 1108"). The drive mechanism 1100 may further include a plurality of set of plungers 1112*a*-1112*n* (hereinafter collectively referred as "the set of plungers 1112"). The drive mechanism 1100 may further include a plurality of set of springs 1114*a*-1114*n* (hereinafter collectively referred as "the set of springs 1114"). Furthermore, the drive mechanism 1100 may include a plurality of set of wavy plates 1106*a*-1106*n* (hereinafter collectively referred as "the set of wavy plates 1106").

Figure 11B:
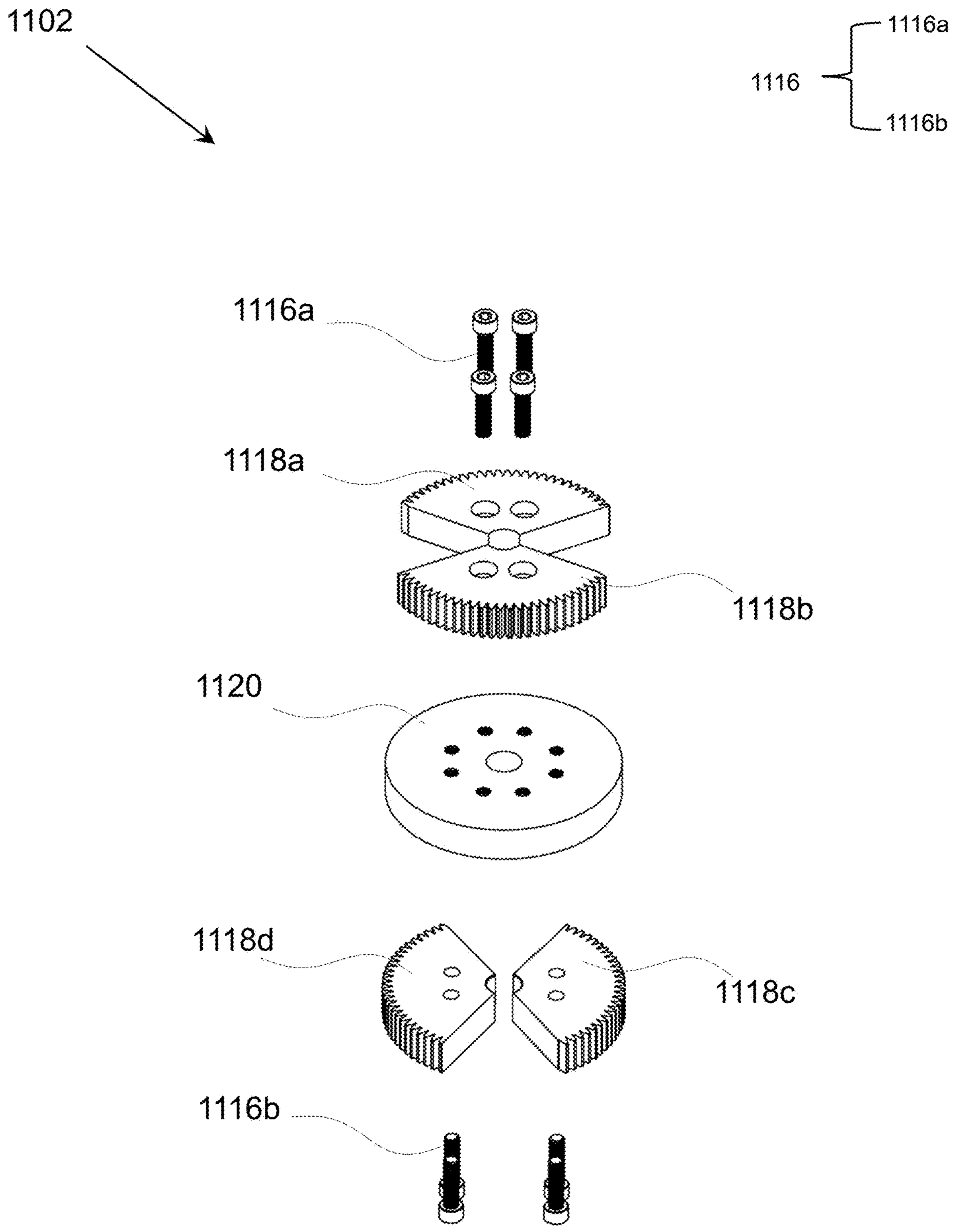
FIG. 11B illustrates an exploded perspective view of an assembly 1102 of the four partially toothed gears with holding plate of FIG. 11A, in accordance with an embodiment of the present disclosure.

FIG. 11B illustrates an exploded perspective view of an assembly 1102 of the four partially toothed gears with holding plate of FIG. 11A, in accordance with an embodiment of the present disclosure. The assembly 1102 of the four partially toothed gears with holding plate may include the four partially toothed gears 1118*a*-1118*d*. Specifically, two partially toothed gears 1118*a* and 1118*b* may be coupled to the upper surface of a holding plate 1120 and two partially toothed gears 1118*c* and 1118*d* may be coupled to lower surface of the holding plate 1120. The assembly 1102 may further include a pair of fasteners 1116*a* and 1116*b* that may be adapted to couple the four partially toothed gears 1118*a*-1118*d* to the holding plate 1120. The assembly 1102 may further include a pair of fasteners 1116*a* and 1116*b* that may be adapted to couple the four partially toothed gears 1118*a*-1118*d* to the holding plate 1120.

Figure 12:
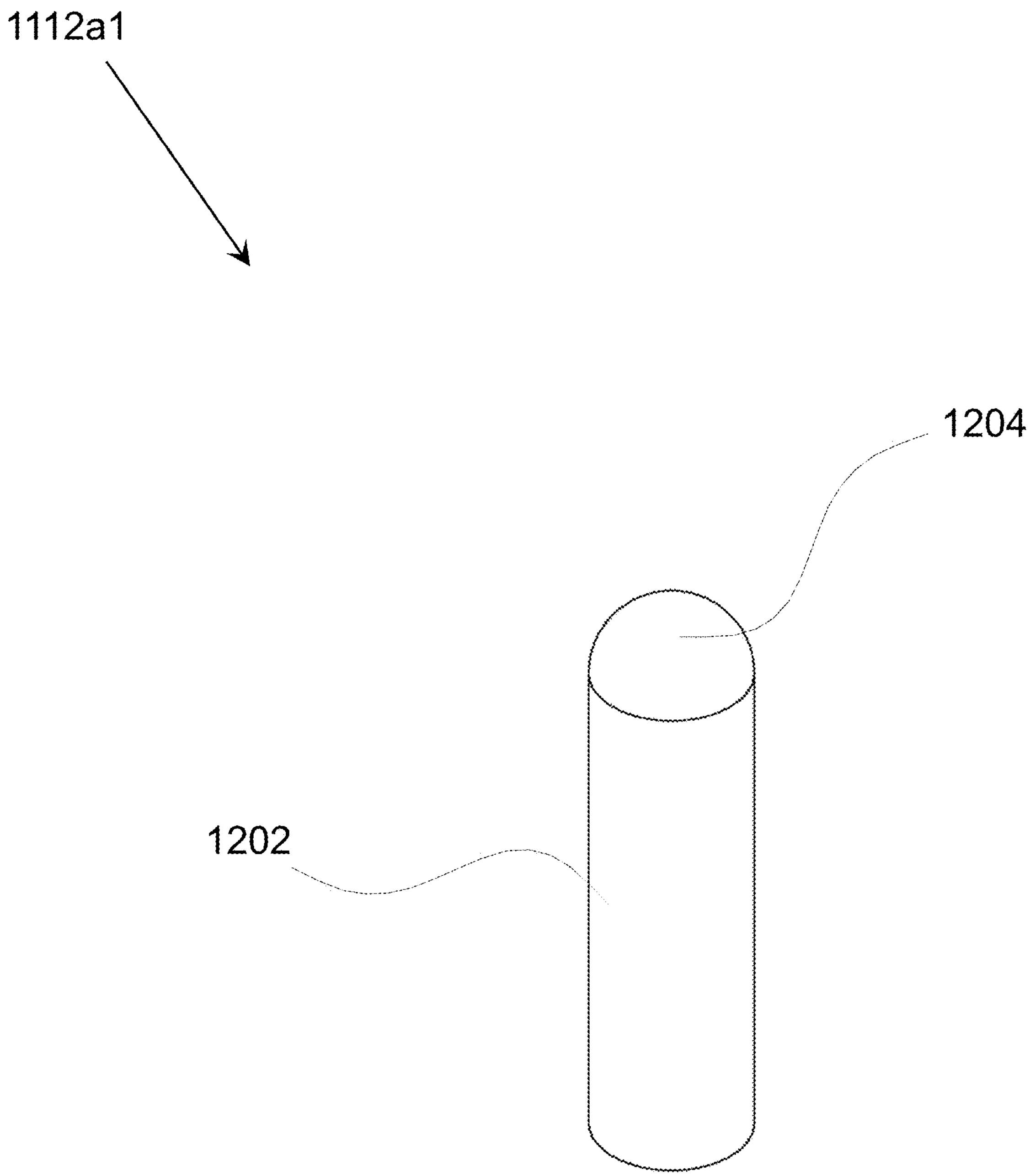
FIG. 12 illustrates a perspective view of a plunger of FIG. 11A, in accordance with an embodiment of the present disclosure.

FIG. 12 illustrates a perspective view of a plunger 1112*a*1 of the set of plungers 1112, in accordance with an embodiment of the present disclosure. The plunger 1112*a*1 may include a ball portion 1204 and a cylindrical side surface 1202. The ball portion 1204 may be adapted to be in constant contact a wavy plate (later shown in FIG. 15A). The cylindrical side surface 1202 may adapted to be inserted in holes that may be present in each fully toothed gear of the first and the second set of fully toothed gears 1104*a*-1104*b* and 1108*a*-1108*b*, respectively.

Figure 13:
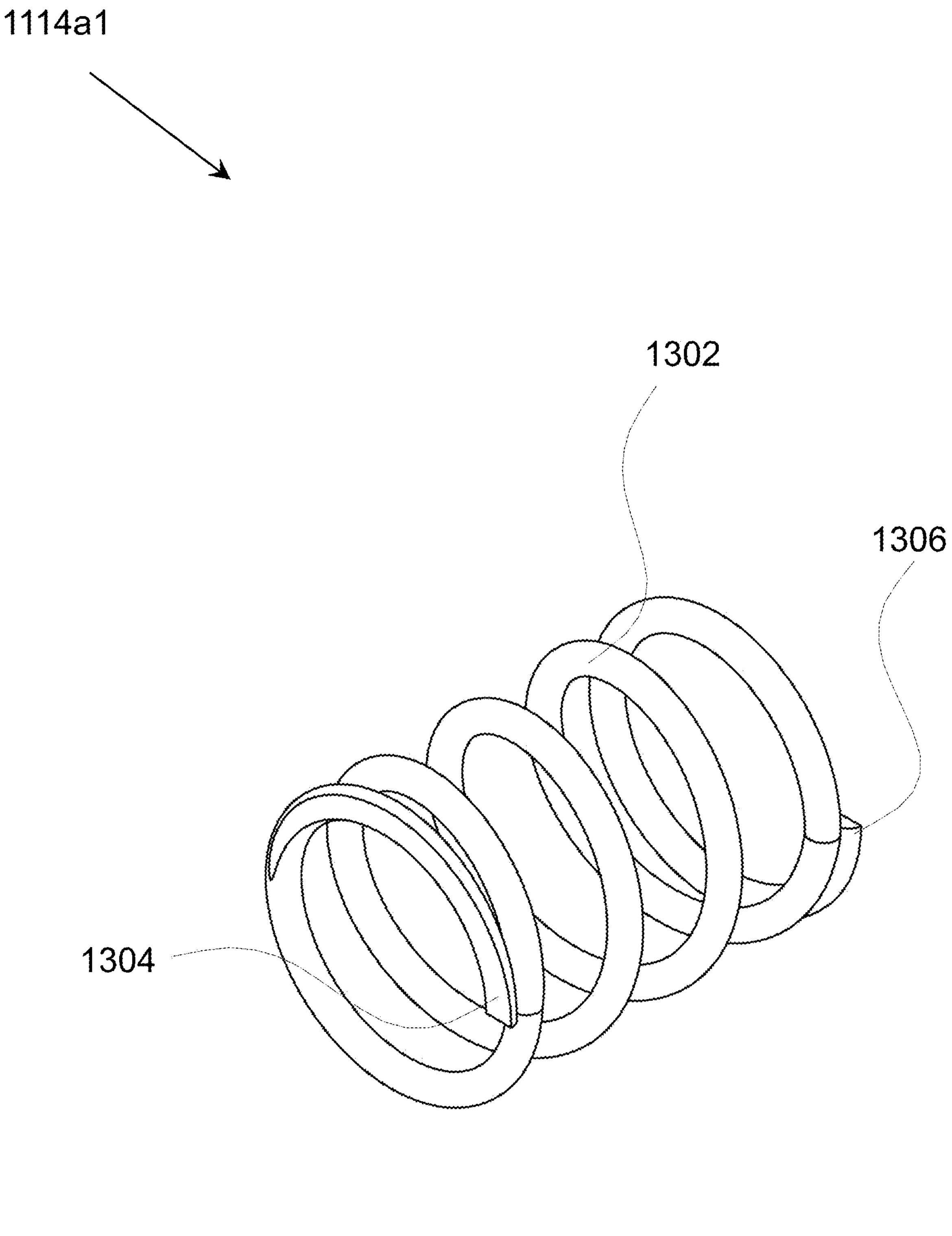
FIG. 13 illustrates a perspective view of a spring of FIG. 11A, in accordance with an embodiment of the present disclosure.

FIG. 13 illustrates a perspective view of a spring 1114*a*1 of the set of springs 1114, in accordance with an embodiment of the present disclosure. The spring 1114*a*1 may include a first end 1304 and a second end 1306, in accordance with an embodiment of the present disclosure. The spring 1114*a*1 may include plurality of coils 1302. The spring 1114*a*1 may be adapted to be placed in each groove of the plurality of grooves (later shown in FIG. 14) that may be present in each fully toothed gear of the first and the second set of fully toothed gears 1104*a*-1104*b* and 1108*a*-1108*b*, respectively.

Figure 14:
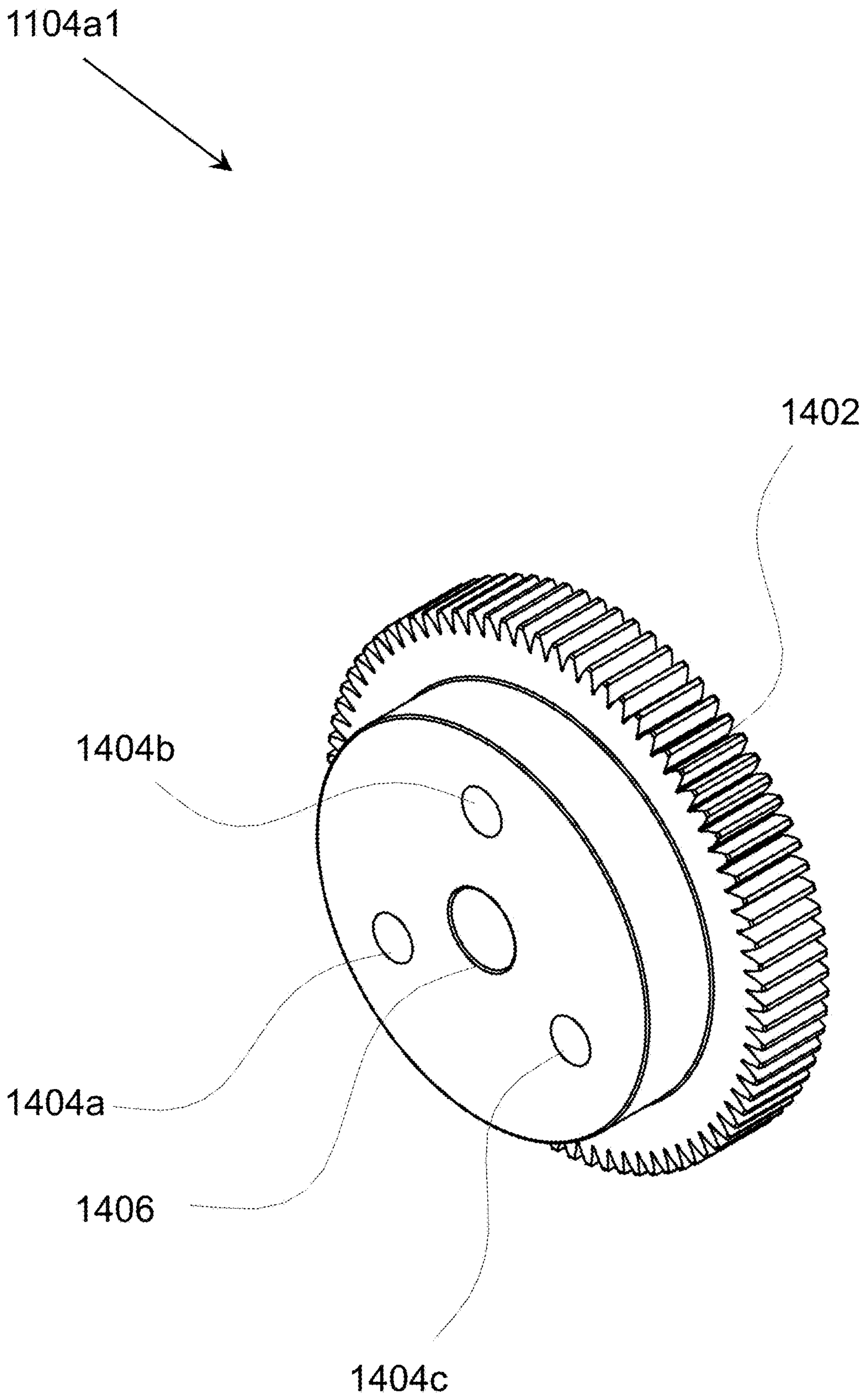
FIG. 14 illustrates a perspective view of a fully toothed gear, in accordance with an embodiment of the present disclosure.

FIG. 14 illustrates a perspective view of a fully toothed gear 1104*a*1 of the first and the second set of fully toothed gears 1104*a*-1104*b* and 1108*a*-1108*b*, respectively, in accordance with an embodiment of the present disclosure. The fully toothed gear 1104*a*1 may include a plurality of teeth 1402 that may be adapted to be in mesh engagement with the plurality of partially toothed gears 1118. The fully toothed gear 1104*a*1 may further include a plurality of holes 1404*a*-1404*c* (hereinafter collectively referred to and designated as "the holes 1404"). The holes 1404 may be adapted to hold the set of springs 1114 and the set of plungers 1112. The fully toothed gear 1104*a*1 may further include a hole 1406 that may be disposed in the central portion of the fully toothed gear 1104*a*1. The hole 1406 may be adapted to couple the fully toothed gear 1104*a*1 to each secondary shaft of the plurality of secondary shafts 1110.

Figure 15A:
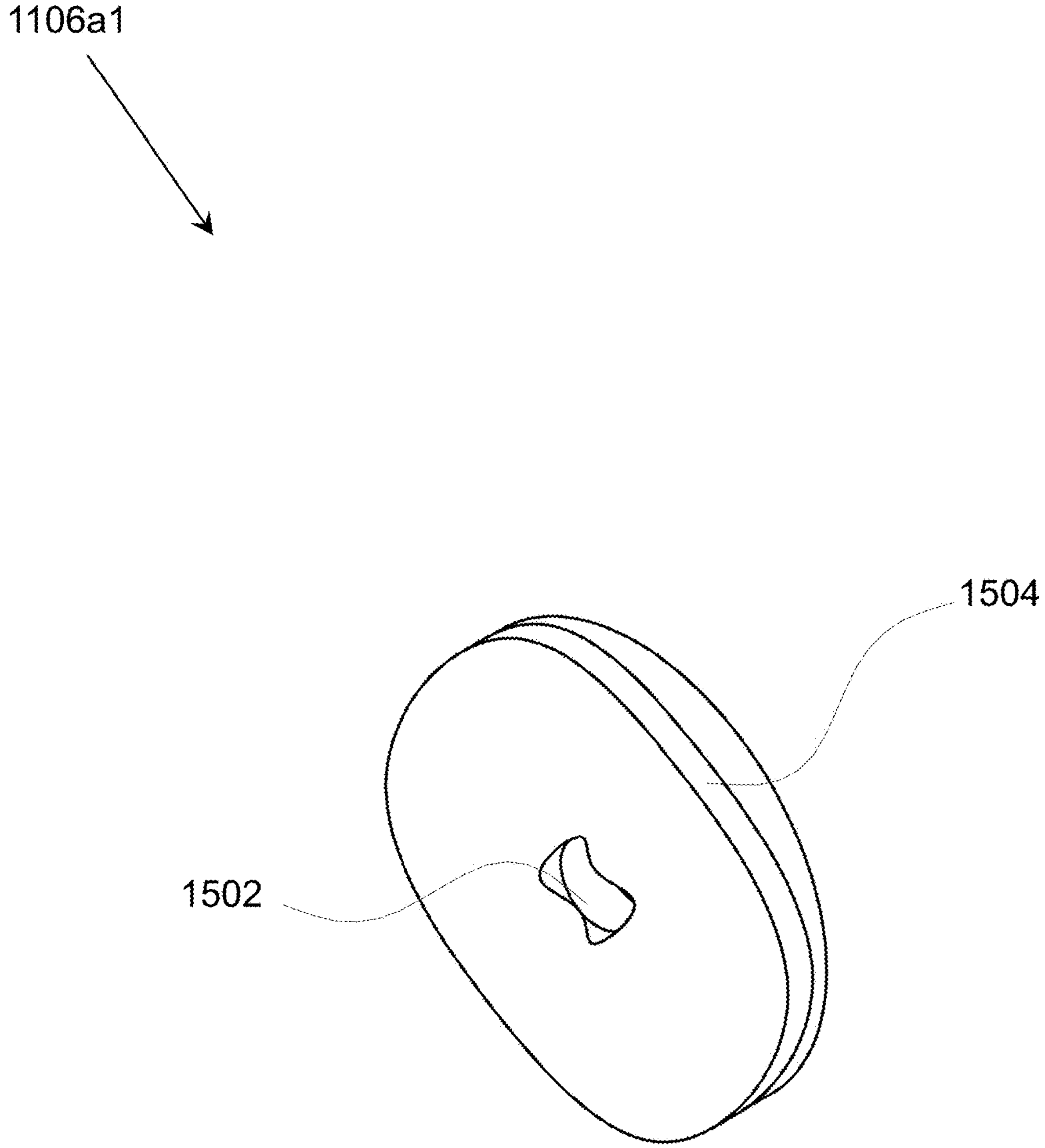
FIG. 15A illustrates a perspective view of a wavy plate, in accordance with an embodiment of the present disclosure.

FIG. 15A illustrates a perspective view of a wavy plate 1106*a*1 of the wavy plates 1106, in accordance with an embodiment of the present disclosure. The wavy plate 1106*al* may include a wavy surface 1504 that is adapted to be in constant contact with each plunger 1112*a*1 of the set of plungers 1112. The wavy plate 1106*a*1 may further include a hole 1502 that may be adapted to couple a wavy plate 1106*a*1 to each secondary shaft of the plurality of secondary shafts 1110.

Figure 15B:
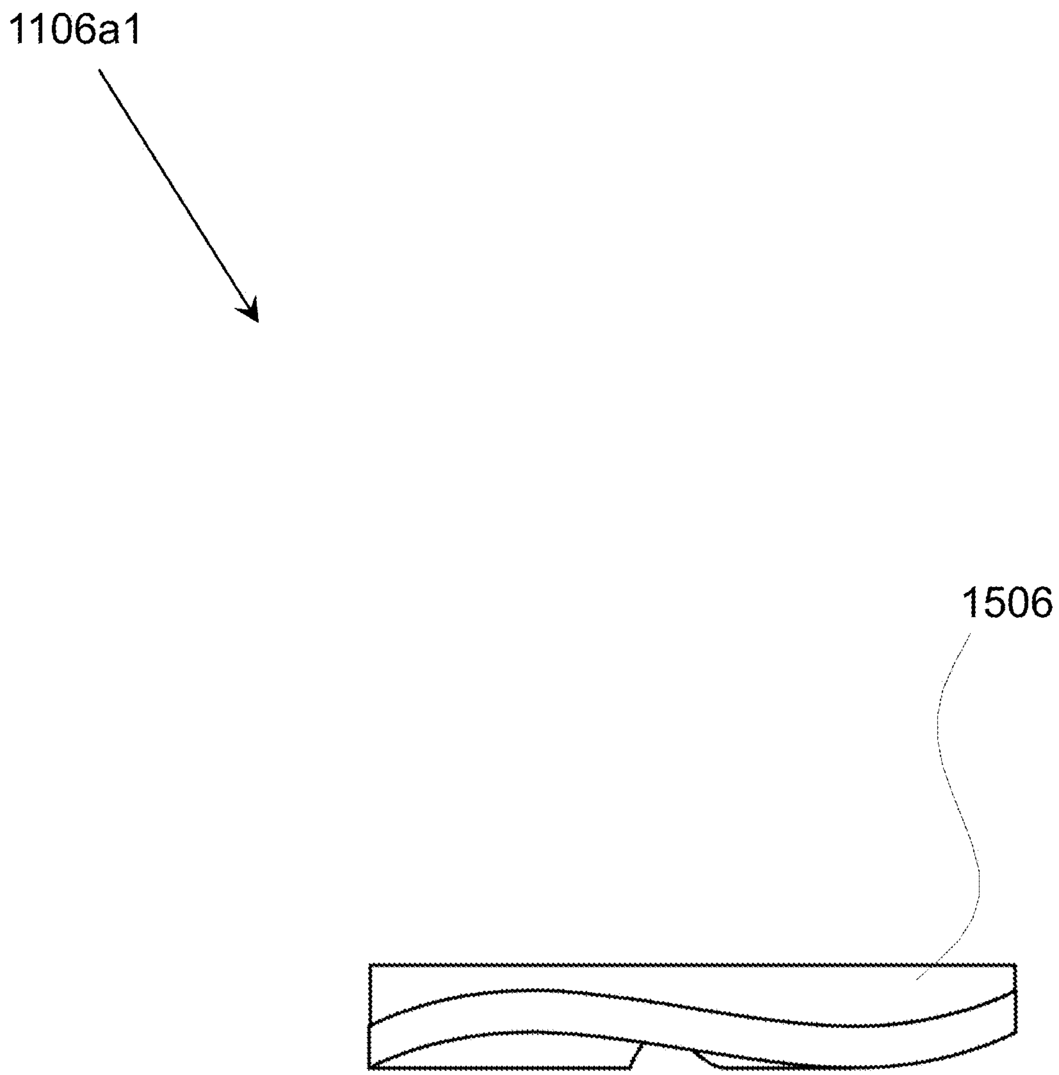
FIG. 15B illustrates a side view of the wavy plate, in accordance with an embodiment of the present disclosure.

FIG. 15B illustrates a side view of the wavy plate 1106*a*1 of the FIG. 15A, in accordance with an embodiment of the present disclosure. The wavy plate 1106*a*1 may further include another flat surface 1506 that may be opposite to the wavy surface 1504.

Figure 16:
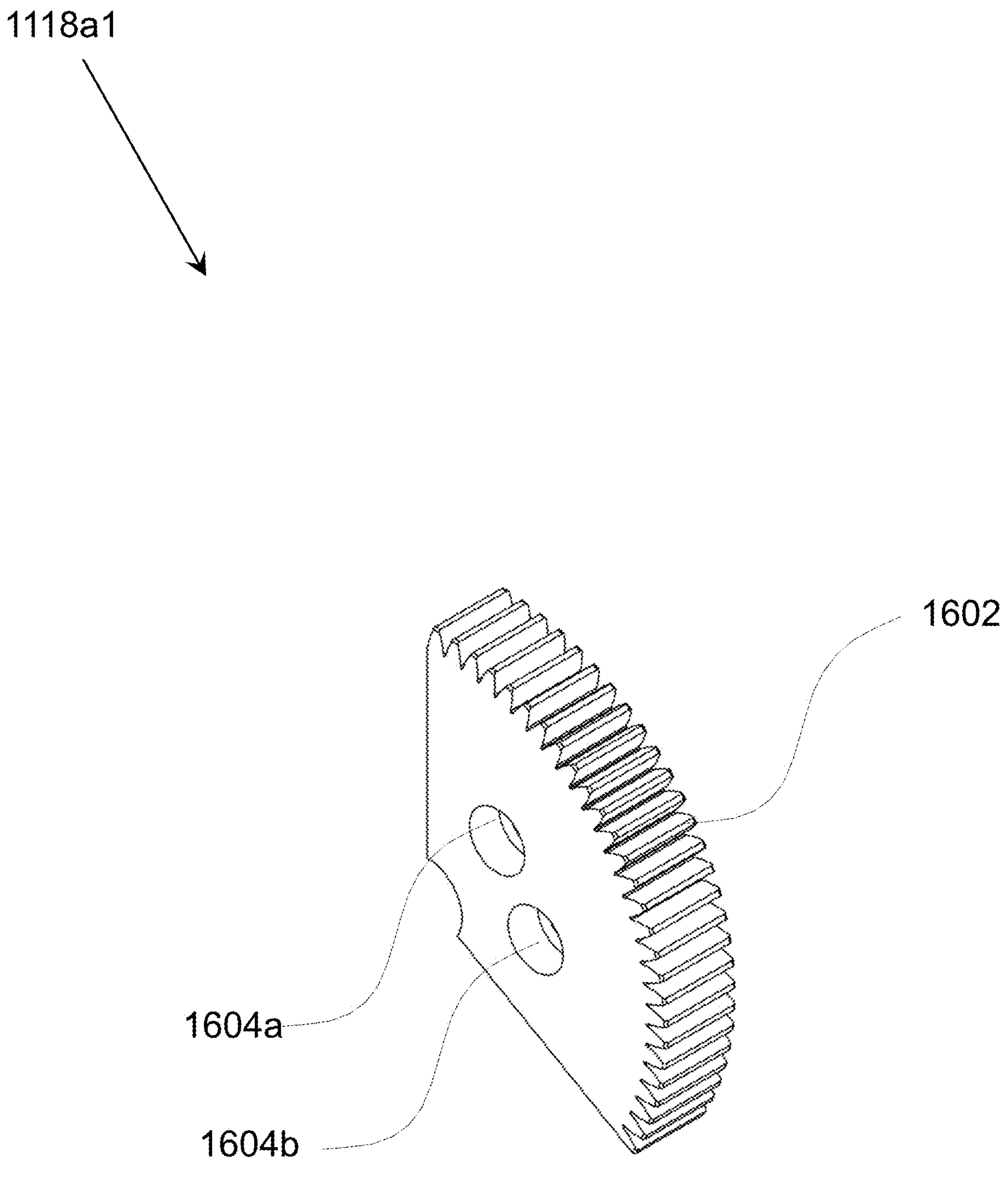
FIG. 16 illustrates a perspective view of a partially toothed gear, in accordance with an embodiment of the present disclosure.

FIG. 16 illustrates a partially toothed gear 1118*a*1 of the partially toothed gears 1118*a*-1118*d*, in accordance with an embodiment of the present disclosure. The partially toothed gear 1118*a*1 may include the plurality of teeth 1602 that may be adapted to be in the mesh arrangement with the each fully toothed gear of the first and the second set of fully toothed gears 1104*a*-1104*b* and 1108*a*-1108*b*, respectively. The partially toothed gear 1118*a*1 may include a pair of holes 1604*a* and 1604*b* that may be adapted to couple to the partially toothed gear 1118*a*1 to the holding plate 1120.

Figure 17:
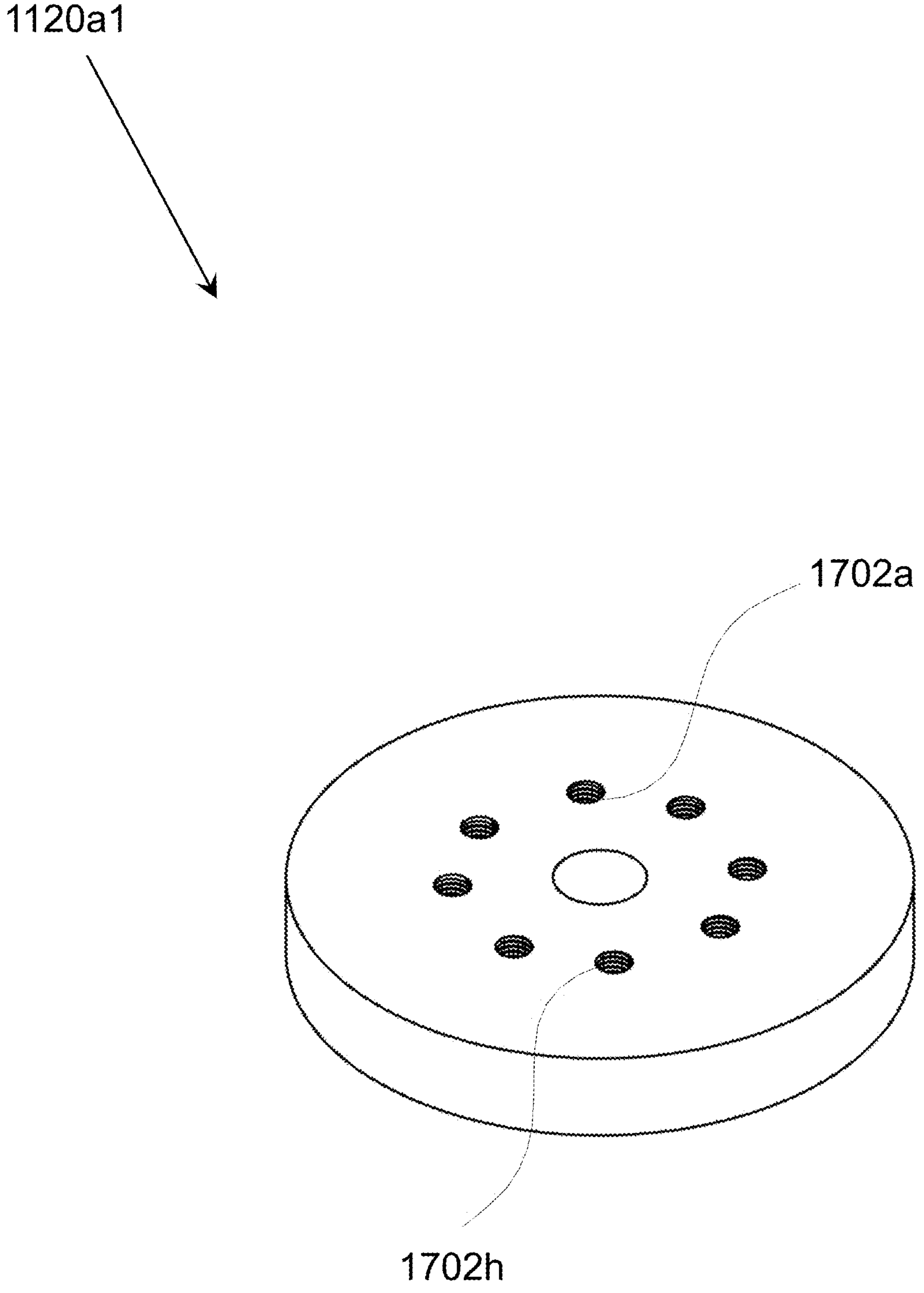
FIG. 17 illustrates a perspective view of a holding plate, in accordance with an embodiment of the present disclosure.

FIG. 17 illustrates the holding plate 1120 of FIG. 11B, in accordance with an embodiment of the present disclosure.

The holding plate 1120 may include the plurality of holes 1702*a*-1702*h* that may be adapted to couple the partially toothed gears 1118*a*-1118*d*.

Thus, the display unit 100 may advantageously facilitate to intermittently show the articles to the viewer. Specifically, the drive mechanism 106 may advantageously facilitate intermittent rotation of the articles such that the viewers see intricate details of the articles. The intermittent rotation of the bases may advantageously facilitate gradual rotation of the bases that may advantageously allow the viewer to spare sufficient time to capture details of the articles placed on the bases.

The foregoing discussion of the present disclosure has been presented for purposes of illustration and description. It is not intended to limit the present disclosure to the form or forms disclosed herein. In the foregoing Detailed Description, for example, various features of the present disclosure are grouped together in one or more aspects, configurations, or aspects for the purpose of streamlining the disclosure. The features of the aspects, configurations, or aspects may be combined in alternate aspects, configurations, or aspects other than those discussed above. This method of disclosure is not to be interpreted as reflecting an intention the present disclosure requires more features than are expressly recited in each claim. Rather, as the following claims reflect, inventive aspects lie in less than all features of a single foregoing disclosed aspect, configuration, or aspect. Thus, the following claims are hereby incorporated into this Detailed Description, with each claim standing on its own as a separate aspect of the present disclosure.

Moreover, though the description of the present disclosure has included description of one or more aspects, configurations, or aspects and certain variations and modifications, other variations, combinations, and modifications are within the scope of the present disclosure, e.g., as may be within the skill and knowledge of those in the art, after understanding the present disclosure. It is intended to obtain rights which include alternative aspects, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A drive mechanism comprising:

a motor unit comprising a motor shaft such that the motor unit generates a rotational force to rotate the motor shaft;

a primary shaft that is adapted to be coupled to the motor unit such that the primary shaft is adapted to be rotated upon rotation of the motor shaft;

a plurality of partially toothed gears that are adapted to be coupled to the primary shaft such that the plurality of partially toothed gears are adapted to be rotated upon rotation of the primary shaft;

a plurality of secondary shafts that are disposed around the primary shaft;

a plurality of fully toothed gears that are coupled to the plurality of secondary shafts wherein each fully toothed gear of the plurality of fully toothed gears is in mesh engagement with each partially toothed gear of the plurality of partially toothed gears such that the plurality of fully toothed gears rotate upon rotation of the plurality of partially toothed gears, and the plurality of secondary shafts rotate upon rotation of the plurality of fully toothed gears;

a plurality of spring loaded ball plungers that are adapted to be disposed around the plurality of fully toothed gears; and a plurality of plates coupled to the plurality of secondary shafts wherein each plate of the plurality of plates comprising an engaging surface and a plurality of grooves that are disposed on the engaging surface, wherein the engaging surface is adapted to be in constant contact with each spring loaded ball plunger of the plurality of spring loaded ball plungers during rotation of each fully toothed gear of the plurality of fully toothed gears, and each groove of the plurality of grooves is adapted to engage with a ball portion of each spring loaded ball plunger of the plurality of spring loaded ball plungers during the rotation of the each fully toothed gear of the plurality of fully toothed gears to intermittently rotate each secondary shaft of the plurality of secondary shafts.

2. The drive mechanism of claim 1, further comprising a holding plate that is coupled to the primary shaft and adapted to be coupled to the plurality of partially toothed gears.

3. The drive mechanism of claim 2, wherein the holding plate comprising an upper surface and a lower surface such that the upper surface and the lower surface are adapted to couple to the plurality of partially toothed gears.

4. The drive mechanism of claim 1, further comprising a plurality of plunger holding plates that are coupled to the plurality of secondary shafts and adapted to be coupled to the plurality of fully teethed gears.

5. The drive mechanism of claim 4, wherein the plurality of plunger holding plates comprising a plurality of holes that are adapted to hold the plurality of spring-loaded ball plungers.

6. The drive mechanism of claim 1, wherein the motor unit further comprising at least one input drive gear coupled to the motor shaft such that the at least one input drive gear rotates upon rotation of the motor shaft.

7. The drive mechanism of claim 1, further comprising at least one driven output gear that is in mesh engagement with the at least one input drive gear and adapted to be rotated upon rotation of the at least one input drive gear.

8. The drive mechanism of claim 7, wherein the primary shaft is coupled to the at least one driven output gear and adapted to be rotated upon rotation of the at least one driven output gear.

9. The drive mechanism of claim 6, wherein the at least one input drive gear comprising one of a worm gear or a pinion bevel gear.

10. The drive mechanism of claim 7, wherein the at least one driven output gear comprising one of a worm wheel gear or a driven bevel gear.

11. A display unit comprising;

a drive mechanism comprising:

a motor unit comprising a motor shaft such that the motor unit generates a rotational force to rotate the motor shaft;

a primary shaft that is adapted to be coupled to the motor unit such that the primary shaft is adapted to be rotated upon rotation of the motor shaft;

a plurality of partially toothed gears that are adapted to be coupled to the primary shaft such that the plurality of partially toothed gears are adapted to be rotated upon rotation of the primary shaft;

a plurality of secondary shafts that are disposed around the primary shaft;

a plurality of fully toothed gears that are coupled to the plurality of secondary shafts wherein each fully toothed gear of the plurality of fully toothed gears is in mesh engagement with each partially toothed gear of the plurality of partially toothed gears such that the plurality of fully toothed gears rotate upon rotation of the plurality of partially toothed gears, and the plurality of secondary shafts rotate upon rotation of the plurality of fully toothed gears;

a plurality of spring loaded ball plungers that are adapted to be disposed around the plurality of fully toothed gears; and a plurality of plates coupled to the plurality of secondary shafts wherein each plate of the plurality of plates comprising an engaging surface and a plurality of grooves that are disposed on the engaging surface, wherein the engaging surface is adapted to be in constant contact with each spring loaded ball plunger of the plurality of spring loaded ball plungers during rotation of each fully toothed gear of the plurality of fully toothed gears, and each groove of the plurality of grooves is adapted to engage with a ball portion of each spring loaded ball plunger of the plurality of spring loaded ball plungers during the rotation of the each fully toothed gear of the plurality of fully toothed gears to intermittently rotate each secondary shaft of the plurality of secondary shafts.

12. The display unit of claim 11, wherein the drive mechanism further comprising a holding plate that is coupled to the primary shaft and adapted to be coupled to the plurality of partially toothed gears.

13. The display unit of claim 12, wherein the holding plate comprising an upper surface and a lower surface such that the upper surface and the lower surface are adapted to couple to the plurality of partially toothed gears.

14. The display unit of claim 11, wherein the drive mechanism further comprising a plurality of plunger holding plates that are coupled to the plurality of secondary shafts and adapted to be coupled to the plurality of fully teethed gears.

15. The display unit of claim 14, wherein the plurality of plunger holding plates comprising a plurality of holes that are adapted to hold the plurality of spring-loaded ball plungers.

16. The display unit of claim 11, wherein the motor unit further comprising at least one input drive gear coupled to the motor shaft such that the at least one input drive gear rotates upon rotation of the motor shaft.

17. The display unit of claim 16, wherein the drive mechanism further comprising at least one driven output gear that is in mesh engagement with the at least one input drive gear and adapted to be rotated upon rotation of the at least one input drive gear.

18. The display unit of claim 17, wherein the primary shaft is coupled to the at least one driven output gear and adapted to be rotated upon rotation of the at least one driven output gear.

19. The display unit of claim 16, wherein the at least one input drive gear comprising one of a worm gear or a pinion bevel gear.

20. The display unit of claim 17, wherein the at least one driven output gear comprising one of a worm wheel gear or a driven bevel gear.

* * * * *